United States Patent
Aweya

(10) Patent No.: US 9,843,405 B2
(45) Date of Patent: Dec. 12, 2017

(54) METHOD AND DEVICES FOR CLOCK SYNCHRONIZATION OVER LINKS WITH ASYMMETRIC TRANSMISSION RATES

(71) Applicants: Khalifa University of Science, Technology, and Research, Abu Dhabi (AE); British Telecommunications plc, London (GB); Emirates Telecommunications Corporation, Abu Dhabi (AE)

(72) Inventor: James Aweya, Abu Dhabi (AE)

(73) Assignees: Khalifa University of Science, Technology, and Research, Abu Dhabi (AE); British Telecommunications PLC, London (GB); Emirates Telecommunications Corporation, Abu Dhabi (AE)

( * ) Notice: Subject to any disclaimer, the term of this patent is extended or adjusted under 35 U.S.C. 154(b) by 238 days.

(21) Appl. No.: 14/566,943

(22) Filed: Dec. 11, 2014

(65) Prior Publication Data

US 2016/0170437 A1    Jun. 16, 2016

(51) Int. Cl.
*H04J 3/06*   (2006.01)
*H04B 10/071*  (2013.01)
*G06F 1/10*   (2006.01)

(52) U.S. Cl.
CPC .............. *H04J 3/0667* (2013.01); *G06F 1/10* (2013.01); *H04B 10/071* (2013.01)

(58) Field of Classification Search
CPC ..... G06F 1/10; G06F 1/12; G06F 1/04; G06F 1/20; G06F 1/32; G06F 1/08; H04B 10/071; H04B 10/25

(Continued)

(56) References Cited

U.S. PATENT DOCUMENTS

| 8,718,482 | B1 * | 5/2014 | Roberts | H04B 10/27 |
| | | | | 398/102 |
| 2004/0082308 | A1 * | 4/2004 | Ngai | H04W 52/30 |
| | | | | 455/322 |

(Continued)

OTHER PUBLICATIONS

ITU-T Recommendation G.8271/Y.1366, Time and Phase Synchronization Aspects of Packet Networks, Feb. 2012.

(Continued)

*Primary Examiner* — Thomas Lee
*Assistant Examiner* — Santosh R Poudel
(74) *Attorney, Agent, or Firm* — Calfee, Halter & Griswold, LLP

(57) ABSTRACT

This invention relates to methods and devices for clock synchronization. The invention has particular application in the alignment of slave clocks to a master clock and in dealing with transmission delay asymmetries where the forward and reverse communication paths between the master and slave clocks have asymmetric transmission rates. Such methods and devices have particular application in small cell backhaul solutions for 4G/LTE deployments. In embodiments of the invention, the slave clock uses link rate information to estimate the transmission delay asymmetry and thus estimate the offset and skew of the slave clock. Embodiments provide a simple linear approximation technique and a Kalman filter-based technique for estimating offset and skew of the slave clock.

11 Claims, 5 Drawing Sheets

(58) Field of Classification Search
USPC .............................................. 713/503; 398/29
See application file for complete search history.

(56) References Cited

U.S. PATENT DOCUMENTS

| | | | | |
|---|---|---|---|---|
| 2009/0319819 | A1* | 12/2009 | Haba ..................... | H04J 3/0661 713/503 |
| 2011/0317583 | A1* | 12/2011 | Tsuda .................... | H04W 28/06 370/253 |
| 2012/0311653 | A1* | 12/2012 | Xu ........................ | H04J 3/0638 725/116 |
| 2013/0182806 | A1* | 7/2013 | Obradovic ............... | H04L 7/04 375/356 |
| 2013/0195443 | A1* | 8/2013 | Yin ....................... | H04J 3/0667 398/25 |
| 2014/0064303 | A1* | 3/2014 | Aweya ................... | H04J 3/0667 370/509 |
| 2014/0068315 | A1* | 3/2014 | Aweya ..................... | G06F 1/04 713/503 |
| 2015/0156664 | A1* | 6/2015 | Tsuda ................ | H04W 28/0284 370/252 |

OTHER PUBLICATIONS

R. E. Kalman, "A New Approach to Linear Filtering and Prediction Problems," Transaction of the ASME—Journal of Basic Engineering, Mar. 1960, pp. 35-45.
C. D. Pack and B. A. Whitaker, "Kalman Filter Models for Network Forecasting," The Bell System Technical Journal, vol. 61, No. 1, Jan. 1982, pp. 1-14.

* cited by examiner

METHOD AND DEVICES FOR CLOCK SYNCHRONIZATION OVER LINKS WITH ASYMMETRIC TRANSMISSION RATES

FIELD OF THE INVENTION

The present invention relates to methods and devices for clock synchronization over links with asymmetric transmission rates. It is particularly, but not exclusively, concerned with clock synchronization over xDSL type links.

BACKGROUND OF THE INVENTION

Mobile penetration and the proliferation of mobile computing devices such as smart phones are driving mobile service providers to deploy more base stations in their networks. Small cells, which are miniature low-power cellular base stations, provide cellular coverage improvement as well as additional capacity. They provide a low-power signal much closer to mobile users than traditional macro networks, resulting in better voice quality, higher data performance and better battery life. By moving the base station closer to the user equipment, end users benefit from more reliable data connections and higher data throughput. They fit well in dense residential and business areas and also have the potential to help rural areas improve connectivity. Small cells types include femtocells, picocells, metrocells and microcells—generally increasing in size from femtocells (the smallest) to microcells (the largest).

Small cells enable operators to provide a higher quality mobile signal where it was never previously economical and/or possible to install conventional base stations and radio network equipment. Such places include indoor environments (e.g., residential apartments, malls, enterprises, public space hotspots, underground facilities, etc.) and many remote outdoor locations. Small cells also enable operators to meet the growing demand for mobile data, by extending the data capacity of the macro network at a fraction of the cost per gigabit (of macro base stations) mainly due to the following reasons: they have simpler design providing low-cost installation and automatic operation; they work with almost any internet connection for backhaul; and they make highly efficient use of valuable spectrum assets of the mobile operator.

Small cells offer mobile service providers a cost-effective alternative to macro-only deployments for meeting growing coverage and capacity demands. Plus, as small cells are added, they offload traffic from the macro network. This increases available network capacity without the deployment of new macro sites. Nevertheless, small cells require, in particular, an economical and, preferably, a readily available backhaul solution to serve the large number of small cells. They require access to the rest of the mobile infrastructure such as macro-cells, clock references and mobile network controllers. They depend on other parts of the infrastructure to provide mobile connectivity, clock synchronization information, backhaul and transport.

Leveraging the existing xDSL infrastructure for mobile backhaul conceivably can lead to lower access costs than traditional leased line services. The x stands for the first letter of the various Digital Subscriber Line (DSL) technologies, for example, ADSL and its variants (Asymmetric DSL), VDSL and its variants (Very high bit rate DSL), etc. It is important to note that in many cases the same infrastructure is also being used for Ethernet services to residential, corporate and enterprise customers, which means that it is suitable for Ethernet/IP interfaces and routing. xDSL solutions have always been mainly used for broadband services but have become relevant for small cell backhaul due to their low cost and pervasiveness.

FIG. 1 shows a schematic arrangement for time transfer to femtocell base stations over networks having asymmetric transmission rates. A radio controller 1 (having a grandmaster clock or timing reference) provides accurate time information to a plurality of slave devices over a packet network 2. A number of headends/aggregation points 3 are connected to the network. These headends 3 comprise either their own grandmaster clock or a boundary clock (BC) which is time and frequency synchronized to the grandmaster in the controller 1. One or more femtocells 4 are connected to the headends 3 over an existing broadband link which operates on a DSL protocol or other cable-based protocols. These femtocells 4 allow mobile devices 5 to access the network and receive voice and data in, for example, indoor environments.

However, the backhaul capacity varies depending on the xDSL technology used as well as the distance from the exchange.

The available data rates on DSL technologies depend on the copper length from the exchange (or DSL Access Multiplexer (DSLAM)). The data rates degrade over distance due to attenuation. The rates that can be delivered also depend on the quality and the gauge of the copper lines used. The bandwidth limitations of copper are being overcome by a technology known as DSL bonding. Multiple copper lines can be bonded to offer higher rates. This is based on adding copper capacity on demand and partitioning the traffic carried over the bonded links. Thus the aggregated traffic from a base station may be transported over multiple DSL links through the implementation of a bonding protocol like IMA (Inverse Multiplexing over ATM) or M2DSL (Multi-Megabit Digital Subscriber Line). Alternatively, bonding could be implemented in a way that is transparent to the DSLAM and based on ML-PPP (Multi-Link Point-To-Point Protocol). New technologies such as vectoring, which employs the coordination of line signals to reduce crosstalk levels (ITU G.993.5), can be used to improve performance.

Synchronization Issues

Synchronization plays a crucial role in mobile backhaul networks. Mobile wireless base stations (both Frequency Division Duplexing (FDD) and Time Division Duplexing (TDD) technologies) derive their carrier radio frequencies (RF) from a highly accurate reference clock. In case of FDD operation, there are two carrier frequencies, one for uplink transmission and one for downlink transmission. Small cells require the RF output to be accurate to within 100 parts per billion (ppb) for carrier-deployed picocells, and 250 ppb for home base stations. Macrocells have a narrower tolerance of 50 ppb, because it is assumed that the user equipment (UE) can be moving, creating a Doppler frequency shift between the UE and the macrocell. A frequency outside these limits may lead to dropped calls during handover between cells, or to the UE being unable to acquire the RF signal from the base station.

In case of TDD operation, there is only one single carrier frequency and uplink and downlink transmissions in the cell are always separated in time. To avoid severe interference between uplink and downlink transmissions despite the fact that the two links use the same frequency, the cells in a TDD network typically use the same uplink downlink configuration together with inter-cell synchronization to a common time reference to align the switch-points among all the cells. This is because downlink and uplink transmission is partitioned into different timeslots, which have to be co-ordinated between adjacent cells. This avoids interference between the two links as uplink and downlink transmissions do not occur at the same time. Small cells require a phase difference of less than 3 µs between base stations of adjacent cells. This is normally achieved by ensuring that the base stations are synchronized to within ±1.5 µs.

4G/LTE-Advanced, in particular, requires even stricter clock distribution accuracy to all base stations to ensure support for new features like Coordinated Multi-Point (COMP) operation, enhanced Inter-Cell Interference Coordination (eICIC), Carrier Aggregation, and Location Based Services (LBS). The accuracy required by each of these techniques has not yet been agreed by 3GPP.

Synchronization may be provided to small cells by distributing either a frequency or packet-based timing reference over the backhaul network. Alternatively, it can be provided by radio, or be built into the base station itself (using a chip-scale atomic oscillator, for example). IEEE 1588 PTP is now the industry accepted packet-based method/standard for distributing timing information from a master to enable the clocks of distributed systems to be synchronized with high precision (accuracies in the nanosecond levels). It is also designed for applications that cannot bear the cost of a GPS receiver plus antenna at each node, or for which GPS signals are inaccessible. Installing a GPS antenna on every cellular base station has consequences in terms of both capital expense and operational expense. In particular, it can add more effort and expenses in the initial installation process of the base station (additional antennas, wiring, receiver) as well as ongoing maintenance (technician time whenever the outdoor antenna requires maintenance, etc.).

Relying on GPS for clock synchronization is not always practical because an unobstructed sky-view to GPS satellites is required (a major problem for the emerging small cell technologies that are mainly targeting buildings, underground facilities, tunnels, closed spaces such as shopping malls, etc.) or its acceptance in certain regions of the world may be hindered by policies based on the reasoning that GPS is American owned technology and infrastructure. Telecom service providers around the world (outside North America) have recognized that and understand that there could be the possibility that one day the general availability and/or accuracy of the GPS service could be terminated and not made available for use outside America. Thus, relying on GPS has drawn strong geopolitical undertones making many countries in Europe and Asia reluctant or apprehensive to make their strategic telecommunications assets dependent on a foreign own asset—the GPS. To find a way out of this dependency, new GNSS (Global Navigation Satellite System) projects like the European Galileo project, the Russian GLONASS and the Chinese Beidou navigation system were initiated. However, up to date, the only fully operational GNSS system with full world coverage existing today is GPS. Another factor that could pose a problem to GPS use is the issue of GPS vulnerability, particularly, GPS jamming (where a GPS receiver could be easily jammed). This could easily be carried out nowadays using off-the-shelf consumer electronics GPS receivers.

The delivery of accurate synchronization to small cell base stations is one of the major challenges facing mobile network operators. One existing approach for bigger base stations like macrocells is to co-locate a GPS receiver and antenna at each base station. But this will not be economical for small cells networks, which most likely will see an exponential growth in the number of cell sites, each covering a relatively small slice of the area covered by a single macrocell base station. Moreover, small cell base stations are much smaller than macrocell base stations, and in many cases they will be unable to host a GPS receiver and antenna, either because there is no space or because there is no clear sky view to a GPS satellite, or both. Also, the issue is simply a matter of economics because purchasing, installing and maintaining a GPS receiver and antenna at every small cell base station will quickly become prohibitively expensive. Furthermore, small cells deployed in the indoor environment are unlikely to be able to acquire a GPS signal, due to the attenuation of the signal caused by the building in which they are housed, and will need to use a network-delivered reference. Hence, transferring timing via packet transport is a relevant synchronization technique that must coexist and interoperate with all others.

However, the challenge in clock transfer over packet networks is dealing with the packet delay variation (PDV) and communication path asymmetries (i.e., asymmetry in forward and reverse path delays) in the network, which can present considerable error components in the recovered clock. These error components have to be adequately mitigated in order to obtain accurate clock performance. The communication path asymmetries can be due to the following: physical link (wire/fiber) asymmetries; internal device signal path and processing delay asymmetries (chip, board, and board-to-board level delays); and load (or queuing) induced asymmetries (which arise when the queuing delays in the forward and reverse paths are different).

An additional source of communication path asymmetry is transmission rate asymmetry which occurs when the forward and reverse paths have different transmission rates resulting in a transmission delay asymmetry. The transmission delay (which is inversely proportional to the transmission rate) is the amount of time it takes to put data on the transmission medium. The higher the transmission rate, the shorter the transmission delay.

Time transfer using a protocol such as IEEE 1588 PTP and a well designed slave clock recovery mechanism can provide time synchronization in the sub-microsecond level and lower. However, this is done using the important assumption that the message transfer delay from master to slave is equal to that from slave to master. In real life, the communication paths are not perfectly symmetric mainly due to dissimilar forward and reverse physical link delays, internal device delays, and queuing delays. Even in cases where the physical link and internal device delays are known and properly compensated for during clock synchronization, queuing delays which are variable can still exist when timing messages go through the packet network and queued for forwarding.

A Transparent Clock (TC) is a fundamental element of an IEEE 1588 synchronization network. It is a network node with special IEEE 1588 functionality and its purpose is to capture the residence time of PTP message as they traverse the network node. This information can then be used by the slave to mitigate the adverse effect of PDV on the transfer of frequency and time without the protocol complexity inherit to terminating a PTP session as would be in the case of using a Boundary Clock (BC). A TC updates the correction field in PTP packets as they traverse the TC. The updates account for the cumulative delay introduced by TCs between master and slave. This cumulative delay can be used to compensate for the synchronization error a slave clock experiences as a result of PDV effects when locking to the GM or BC. BCs provide a means to distribute synchronization information in larger networks by building a clock hierarchy. The BC relieves the GM from handling a large number of ordinary clocks by segmenting downsteam networks into areas.

In xDSL and GPON, for example, the inherent transmission rate asymmetry is additional source of delay asymmetry that needs to be properly addressed during clock synchronization.

Overview of IEEE 1588v2 PTP

The IEEE 1588v2 PTP defines a packet-based synchronization protocol for communicating frequency, phase and time-of-day information from a master to one or more slaves with sub-microsecond accuracy. PTP relies on the use of accurately timestamped packets (at nanosecond level granularity) sent from a master clock to one or more slave clocks to allow them to (frequency or time) synchronize to the master clock. Synchronization information is distributed hierarchically, with a GrandMaster clock at the root of the hierarchy. The GrandMaster provides the time reference for one or more slave devices. These slave devices can, in turn, act as master devices for further hierarchical layers of slave devices. PTP provides a mechanism (i.e., Best Master Clock Algorithm) for slave clocks to select the best master clock in their respective synchronization domain. The selection is performed according to the PTP attributes of the GrandMaster (e.g. PTP priority, clock class).

The typical PTP message exchange process (i.e., the PTP Delay Request/Delay Response flow) between a master 10 and a slave 30 is performed as follows and illustrated in FIG. 2. IEEE 1588 PTP allows for two different types of timestamping methods, either one-step or two-step. One-step clocks update time information within event messages (Sync and Delay-Req) on-the-fly, while two-step clocks convey the precise timestamps of packets in general messages (Follow_Up and Delay-Resp). A Sync message is transmitted by a master to its slaves and either contains the exact time of its transmission or is followed by a Follow_Up message containing this time. In a two-step ordinary or boundary clock, the Follow_Up message communicates the value of the departure timestamp for a particular Sync message.

FIG. 2 illustrates the basic pattern of synchronization message exchanges for the two-step clocks. The master 10 sends a Sync message to the slave 30 over the network 2 and notes the time $T_1$ at which it was sent according to the clock in the master 10, which is synchronized with a clock reference 11 such as the GPS. The slave 30 receives the Sync message and notes the time of reception $T_2$. The master conveys to the slave the timestamp $T_1$ by one of two ways: 1) Embedding the timestamp $T_1$ in the Sync message (one-step clock)—this requires some sort of hardware processing (i.e., hardware timestamping) for highest accuracy and precision; or 2) Embedding the timestamp 1; a Follow_Up message. Next, the slave 30 sends a Delay_Req message to the master and notes the time $T_3$ at which it was sent according to the slave clock 31. The master 10 receives the Delay_Req message and notes the time of reception J. The master 10 conveys to the slave 30 the timestamp $T_4$ by embedding it in a Delay_Resp message.

At the end of this PTP message exchange, the slave 30 possesses all four timestamps $\{T_1, T_2, T_3, T_4\}$. These timestamps may be used to compute the offset of the slave's clock 31 with respect to the master and the communication delay of messages between the two clocks. The computation of offset and propagation time often assumes that the master-to-slave and slave-to-master propagation times are equal, i.e. that the communication paths are symmetrical. Clock frequencies change over time, so periodic message exchanges are required. Because these clock variations change slowly, the period between message exchanges is typically on the order of milliseconds to seconds.

The present invention aims to provide methods and systems which improve the accuracy of time synchronization over links which have inherent asymmetries in the communication paths, such as existing broadband infrastructure.

This may allow the adoption of highly accurate time synchronization over such communication paths, thereby permitting wide deployment of small cell base stations for mobile telecommunications.

Small cells are a critical component of 4G/LTE ultra-broadband deployments as they enable operators to boost coverage and capacity in busy areas such as shopping malls, sports stadiums and high-traffic roads. By bringing the base station closer to the end user, small cells assure exceptional mobile broadband including enriched multimedia services wherever consumers are located. Small cells require, in particular, an economical and, preferably, a readily available backhaul solution to serve the large number of small cells. They require access to the rest of the mobile infrastructure such as macro-cells, clock references and mobile network controllers. Leveraging the existing broadband (e.g., xDSL, GPON) infrastructure for small cells backhaul conceivably can lead to lower access costs than traditional leased line services. For time synchronization, the quality of the time distribution depends heavily on the level of packet delay variation (PDV) and communication path asymmetries between the clock source (master) and the receiver (slave). An additional source of communication path asymmetry (that exists in technologies such as xDSL and GPON) is transmission rate asymmetry which occurs when the forward and reverse paths have different transmission rates resulting in a transmission delay asymmetry. Transmission delay asymmetry further complicates the problem of clock recovery at the end-user (slave).

Therefore, an object of the present invention is to provide systems and methods for accurate time transfer over links with asymmetric transmission rates (e.g., xDSL, GPON).

SUMMARY OF THE INVENTION

An exemplary embodiment of the invention provides a method of synchronising a slave clock in a slave device with a master clock in a master device, the master and slave device being connected by a network having asymmetric transmission rates, the method including the steps of: exchanging timing messages between the master device and the slave device over said network and recording timestamps which are the times of sending and receiving said messages; calculating or estimating the relative transmission rates of data from the master to the slave and vice-versa; calculating the skew and offset of the slave clock compared to the master clock using said timestamps and said transmission rates; and synchronizing said slave clock using said calculated offset and skew.

A further exemplary embodiment of the invention provides a slave device connected to a master device having a master clock by a network having asymmetric transmission rates, the slave device having a slave clock and a processor, the slave device being arranged to: exchange timing messages with the master device over said network and record timestamps which are the times of sending and receiving said messages according to the respective clocks; and calculate or estimate the relative transmission rates of data from the master to the slave and vice-versa, wherein: the processor is arranged to: calculate the skew and offset of the slave clock compared to the master clock using said timestamps and said transmission rates; and synchronize said slave clock using said calculated offset and skew.

A further exemplary embodiment of the invention provides a system including: a master device having a master clock; a slave device having a slave clock and a processor; and a network connecting said master device and said slave device and having asymmetric transmission rates, wherein the slave device is arranged to: exchange timing messages with the master device over said network and record timestamps which are the times of sending and receiving said messages according to the respective clocks; and calculate or estimate the relative transmission rates of data from the master to the slave and vice-versa, and further wherein: the processor is arranged to: calculate the skew and offset of the slave clock compared to the master clock using said timestamps and said transmission rates; and synchronize said slave clock using said calculated offset and skew.

A further exemplary embodiment of the present invention provides a method of synchronising a slave clock in a slave device with a master clock in a master device, the master and slave device being connected by a network having asymmetric transmission rates, the method including the steps of: determining the maximum communication rate over said network between the slave and the master; exchanging timing messages between the master device and the slave device over said network and recording timestamps which are the times of sending and receiving said messages, wherein the rate of data transfer applied to said timing messages is restricted in both directions to a rate which is fixed by the master and the slave as less than said maximum communication rate; calculating the skew and offset of the slave clock compared to the master clock using said timestamps; and synchronizing said slave clock using said calculated offset and skew.

A further exemplary embodiment of the present invention provides a system including: a master device having a master clock and a first rate controller; a slave device having a slave clock, a processor and a second rate controller; and a network connecting said master device and said slave device and having asymmetric transmission rates, wherein the system is arranged to: estimate or determine the maximum communication rate over said network between the slave and the master; and determine a timing message exchange rate which is a rate which is less than said maximum communication rate; the master and slave devices are arranged to: exchange timing messages between the master device and the slave device over said network and recording timestamps which are the times of sending and receiving said messages, wherein the first and second rate controller restrict the rate of data transfer of said timing messages to said timing message exchange rate; and the processor is arranged to: calculate the skew and offset of the slave clock compared to the master clock using said timestamps; and synchronize said slave clock using said calculated offset and skew.

BRIEF DESCRIPTION OF THE DRAWINGS

Embodiments of the invention will now be described by way of example with reference to the accompanying drawings in which.

DETAILED DESCRIPTION

Figure 1:
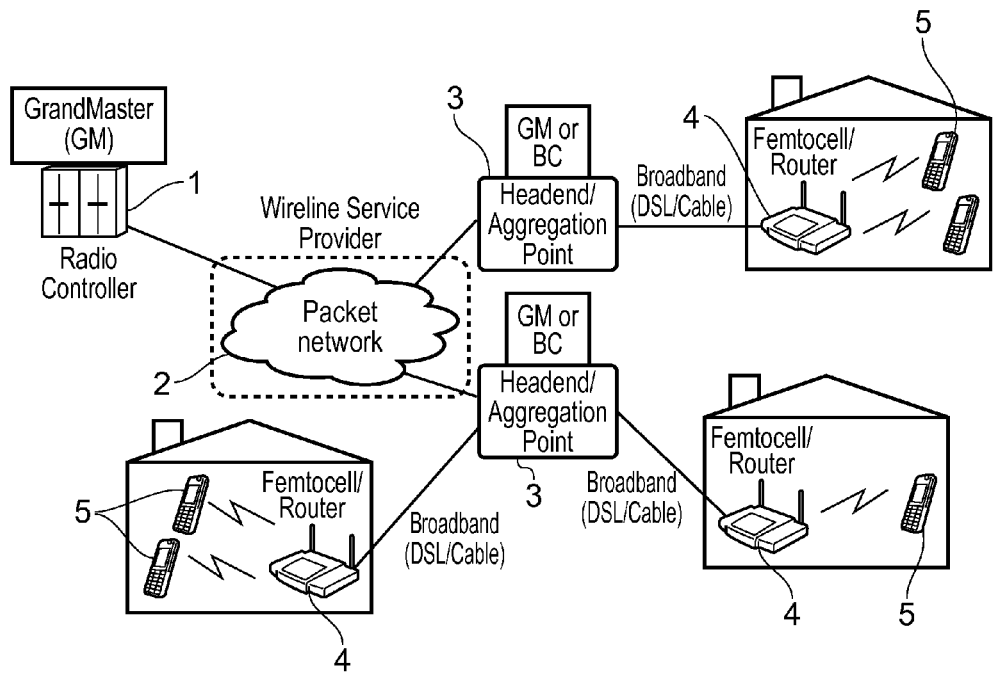
FIG. 1 shows a schematic arrangement of time transfer to femtocell base stations and has already been described.

At their broadest, a first set of aspects of the present invention provide for synchronization of a slave clock to a master clock over a network with asymmetric transmission rates wherein the synchronization takes account of the relative transmission rates in each direction.

A first aspect of the present invention provides a method of synchronising a slave clock in a slave device with a master clock in a master device, the master and slave device being connected by a network having asymmetric transmission rates, the method including the steps of: exchanging timing messages between the master device and the slave device over said network and recording timestamps which are the times of sending and receiving said messages; calculating or estimating the relative transmission rates of data from the master to the slave and vice-versa; calculating the skew and offset of the slave clock compared to the master clock using said timestamps and said transmission rates; and synchronizing said slave clock using said calculated offset and skew.

The method of this aspect is able to compensate for delays arising as a result of rate asymmetry and therefore may result in a more accurate synchronization of the slave clock to the master clock.

The network may be a network operating under xDSL or GPON, and in particular may be part of an existing broadband infrastructure, where inherent asymmetries in the data transfer rate exist and may previously have hindered synchronization over such links. Such methods may find particular application in synchronization over existing broadband infrastructure, such as xDSL and GPON, where inherent asymmetries in the data transfer rate exist and may previously have hindered synchronization over such links.

In particular the method of the present aspect may improve the quality of the time distribution in such networks, allowing existing broadband (e.g., xDSL, GPON) infrastructure to be readily used for the backhaul for small cell base stations for mobile telecommunications. Small cells enable operators to provide a higher quality mobile signal where it was never previously economical and/or possible to install conventional base stations and radio network equipment, including indoor environments (e.g., residential apartments, malls, enterprises, public space hotspots, underground facilities, etc.) and many remote outdoor locations. Small cells can also enable operators to meet the growing demand for mobile data, by extending the data capacity of the macro network at a fraction of the cost per gigabit (of macro base stations).

In certain embodiments, the step of calculating the skew and offset uses an exponentially weighted moving average filter applied to said timestamps and said transmission rates.

For example, the step of calculating the skew and offset calculates the skew $\alpha$ as the average of the skew $\alpha_1$ calculated in the forward direction from master to slave and the skew $\alpha_2$ calculated in the reverse direction from the slave to the master:

$$\alpha_1 = \frac{(T_{1,n} - T_{1,n-1})}{(T_{2,n} - T_{2,n-1})} - 1 \quad \& \quad \alpha_2 = \frac{(T_{4,n} - T_{4,n-1})}{(T_{3,n} - T_{3,n-1})} - 1,$$

wherein $T_{1,n}$ is the time of departure of the nth Sync message as measured by the master clock; $T_{2,n}$ is the time of receipt as recorded by the slave clock on receipt of the nth Sync message; $T_{3,n}$ is the time of transmission of the nth Delay_Req message as recorded by the slave clock; $T_{4,n}$ is the time of receipt of the nth Delay_Req message as recorded by the master clock, and calculates the offset $\theta$ as $\theta = T_{1,n} - (1+\alpha)T_{2,n} + d + p_{ds}$, wherein: $\xi$ is the ratio of the transmission rate from master to slave to the transmission rate from slave to master, $p_{ds}$ is the fixed physical link (or propagation) delay of the network between the master and the slave device; and $$d = \frac{(T_{4,n} - T_{1,n}) + (1+\alpha)(T_{2,n} - T_{3,n}) - (p_{ds} + p_{us})}{(1+\xi)},$$

wherein: $p_{us}$ is the fixed physical link delay of the network between the slave and the master device, and updates the offset and skew according to the update equations: $\hat{\alpha}_n = \mu \alpha_n + (1-\mu)\hat{\alpha}_{n-1}$, $0 < \mu < 1$ and $\hat{\theta}_n = \mu \theta_n + (1-\mu)\hat{\theta}_{n-1}$, $0 < \mu < 1$.

The exponentially weighted moving average filter is a simple linear approximation technique which allows account to be take of previous measurements when calculating the measurement of a quantity for the current time frame. By adjusting the parameter $\mu$, the influence of previous calculations can be reduced or increased accordingly. For small values of $\mu$, the offset and skew are dominated by the measurements at the current time. For larger values of $\mu$, the offset and skew take greater account of previous values, which can smooth the running calculation of these values and reduce the effect of spikes in the instantaneous calculations.

In other embodiments of the present invention, the step of calculating the skew and offset uses a Kalman filter.

For example to determine the skew $\alpha_n$ and the offset $\theta_n$ at time n, the Kalman filter may be applied to: the state equation $$X_n = \begin{bmatrix} \theta_n \\ \alpha_n \end{bmatrix} = \begin{bmatrix} 1 & (T_{1,n} - T_{1,n-1}) \\ 0 & 1 \end{bmatrix} \begin{bmatrix} \theta_{n-1} \\ \alpha_{n-1} \end{bmatrix} + \begin{bmatrix} w_{\theta,n} \\ w_{\alpha,n} \end{bmatrix}$$

and to the measurement equation $y_n = D_n X_n + v_n$, wherein:
$y_n = (1+\xi)(T_{1,n} - T_{2,n} + p_{ds}) + (T_{4,n} - T_{1,n} + T_{2,n} - T_{3,n} - p_{ds} - p_{us})$ is a scalar,
$D_n = [(1+\xi) - [(T_{2,n} - T_{3,n}) - (1+\xi)T_{2,n}]]$ is a 1×2 matrix, $X_n^T = [\theta_n \ \alpha_n]$ is a vector and
$v_n = (\gamma_n - \xi \epsilon_n)$ is the measurement noise, and wherein: $T_{1,n}$ is the time of departure of the nth Sync message as measured by the master clock; $T_{2,n}$ is the time of receipt as recorded by the slave clock on receipt of the nth Sync message; $T_{3,n}$ is the time of transmission of the nth Delay_Req message as recorded by the slave clock; $T_{4,n}$ is the time of receipt of the nth Delay_Req message as recorded by the master clock; is the ratio of the transmission rate from master to slave to the transmission rate from slave to master, $p_{ds}$ is the fixed physical link (or propagation) delay of the network between the master and the slave device; $\epsilon$ is the stochastic delay in the transmission of messages between the master and the slave device; $\mu_{us}$ is the fixed physical link delay of the network between the slave and the master device; and $\gamma$ is the stochastic delay in the transmission of messages between the slave and the master device.

The method of the present aspect may include any combination of some, all or none of the above described preferred and optional features.

The method of the above aspect is preferably implemented by a slave device or a system according to the second or third aspects of this invention, as described below, but need not be.

Further aspects of the present invention include computer programs for running on computer systems which carry out the method of the above aspect, including some, all or none of the preferred and optional features of that aspect.

A second aspect of the present invention provides a slave device connected to a master device having a master clock by a network having asymmetric transmission rates, the slave device having a slave clock and a processor, the slave device being arranged to: exchange timing messages with the master device over said network and record timestamps which are the times of sending and receiving said messages according to the respective clocks; and calculate or estimate the relative transmission rates of data from the master to the slave and vice-versa, wherein: the processor is arranged to: calculate the skew and offset of the slave clock compared to the master clock using said timestamps and said transmission rates; and synchronize said slave clock using said calculated offset and skew.

The slave device of this aspect is able to compensate for delays arising as a result of rate asymmetry in the network and therefore may result in a more accurate synchronization of the slave clock to the master clock.

The network may be a network operating under xDSL or GPON, and in particular may be part of an existing broadband infrastructure, where inherent asymmetries in the data transfer rate exist and may previously have hindered synchronization over such links.

In particular the slave device of present aspect may have improved synchronization over in such networks. The slave device may be a small cell base station for mobile telecommunications, or connected to a small cell base station, thereby allowing existing broadband (e.g., xDSL, GPON) infrastructure to be readily used for the backhaul for such small cell base stations. Small cells enable operators to provide a higher quality mobile signal where it was never previously economical and/or possible to install conventional base stations and radio network equipment, including indoor environments (e.g., residential apartments, malls, enterprises, public space hotspots, underground facilities, etc.) and many remote outdoor locations. Small cells can also enable operators to meet the growing demand for mobile data, by extending the data capacity of the macro network at a fraction of the cost per gigabit (of macro base stations).

In certain embodiments, the processor calculates the skew and offset using an exponentially weighted moving average filter applied to said timestamps and said transmission rates by calculating the skew $\alpha$ as the average of the skew a1 calculated in the forward direction from master to slave and the skew $\alpha_2$ calculated in the reverse direction from the slave to the master:

$$\alpha_1 = \frac{(T_{1,n} - T_{1,n-1})}{(T_{2,n} - T_{2,n-1})} - 1 \ \& \ \alpha_2 = \frac{(T_{4,n} - T_{4,n-1})}{(T_{3,n} - T_{3,n-1})} - 1,$$

wherein $T_{1,n}$ is the time of departure of the nth Sync message as measured by the master clock; $T_{2,n}$ is the time of receipt as recorded by the slave clock on receipt of the nth Sync message; $T_{3,n}$ is the time of transmission of the nth Delay_Req message as recorded by the slave clock; $T_{4,n}$ is the time of receipt of the nth Delay_Req message as recorded by the master clock, and calculating the offset θ as $\theta = T_{1,n} - (1+\alpha) T_{2,n} + d + p_{ds}$, wherein: ξ is the ratio of the transmission rate from master to slave to the transmission rate from slave to master, $p_{ds}$ is the fixed physical link (or propagation) delay of the network between the master and the slave device; and $$d = \frac{(T_{4,n} - T_{1,n}) + (1 + \alpha)(T_{2,n} - T_{3,n}) - (p_{ds} + p_{us})}{(1 + \xi)},$$

wherein: $p_{us}$ is the fixed physical link delay of the network between the slave and the master device, and updates the offset and skew according to the update equations: $\hat{\alpha}_n = \mu\alpha_n + (1-\mu)\hat{\alpha}_{n-1}$, $0 < \mu < 1$ and $\hat{\theta}_n = \mu\theta_n + (1-\mu)\hat{\theta}_{n-1}$, $0 < \mu < 1$.

The exponentially weighted moving average filter is a simple linear approximation technique which allows account to be take of previous measurements when calculating the measurement of a quantity for the current time frame. By adjusting the parameter μ, the influence of previous calculations can be reduced or increased accordingly. For small values of μ, the offset and skew are dominated by the measurements at the current time. For larger values of μ, the offset and skew take greater account of previous values, which can smooth the running calculation of these values and reduce the effect of spikes in the instantaneous calculations.

In other embodiments, the processor may calculate the skew and offset using a Kalman filter to determine the skew $\alpha_n$ and the offset $\theta_n$ at time n, the Kalman filter being applied to: the state equation $$X_n = \begin{bmatrix} \theta_n \\ \alpha_n \end{bmatrix} = \begin{bmatrix} 1 & (T_{1,n} - T_{1,n-1}) \\ 0 & 1 \end{bmatrix} \begin{bmatrix} \theta_{n-1} \\ \alpha_{n-1} \end{bmatrix} + \begin{bmatrix} w_{\theta,n} \\ w_{\alpha,n} \end{bmatrix}$$

and to the measurement equation $y_n = D_n X_n + v_n$, wherein: $y_n = (1+\xi)(T_{1,n} - T_{2,n} + p_{ds}) + (T_{4,n} - T_{1,n} + T_{2,n} - T_{3,n} - p_{ds} - p_{us})$ is a scalar,
$D_n = [(1+\xi) - [(T_{2,n} - T_{3,n}) - (1+\xi)T_{2,n}]]$ is a 1×2 matrix, $X_n^T = [\theta_n \ \alpha_n]$ is a vector and
$v_n = (\gamma_n - \xi\epsilon_n)$ is the measurement noise, and wherein: $T_{1,n}$ is the time of departure of the nth Sync message as measured by the master clock; $T_{2,n}$ is the time of receipt as recorded by the slave clock on receipt of the nth Sync message; $T_{3,n}$ is the time of transmission of the nth Delay_Req message as recorded by the slave clock; $T_{4,n}$ is the time of receipt of the nth Delay_Req message as recorded by the master clock; ξ is the ratio of the transmission rate from master to slave to the transmission rate from slave to master, $p_{ds}$ is the fixed physical link (or propagation) delay of the network between the master and the slave device; ε is the stochastic delay in the transmission of messages between the master and the slave device; $p_{us}$ is the fixed physical link delay of the network between the slave and the master device; and γ is the stochastic delay in the transmission of messages between the slave and the master device.

The Kalman filter allows measurements of a process observed over time, containing noise and other inaccuracies, to be used to produce values (estimates) that tend to be closer to the true values of the measurements and their associated calculated values.

The slave device of the present aspect may include any combination of some, all or none of the above described preferred and optional features.

A third aspect of the present invention provides a system including: a master device having a master clock; a slave device having a slave clock and a processor; and a network connecting said master device and said slave device and having asymmetric transmission rates, wherein the slave device is arranged to: exchange timing messages with the master device over said network and record timestamps which are the times of sending and receiving said messages according to the respective clocks; and calculate or estimate the relative transmission rates of data from the master to the slave and vice-versa, and further wherein: the processor is arranged to: calculate the skew and offset of the slave clock compared to the master clock using said timestamps and said transmission rates; and synchronize said slave clock using said calculated offset and skew.

The system of this aspect is able to compensate for delays arising as a result of rate asymmetry in the network and therefore may result in a more accurate synchronization of the slave clock to the master clock.

The network may be a network operating under xDSL or GPON, and in particular may be part of an existing broadband infrastructure, where inherent asymmetries in the data transfer rate exist and may previously have hindered synchronization over such links.

In particular the slave device may have improved synchronization in such networks compared to previous devices. The slave device may be a small cell base station for mobile telecommunications, or connected to a small cell base station, thereby allowing existing broadband (e.g., xDSL, GPON) infrastructure to be readily used for the backhaul for such small cell base stations. Small cells enable operators to provide a higher quality mobile signal where it was never previously economical and/or possible to install conventional base stations and radio network equipment, including indoor environments (e.g., residential apartments, malls, enterprises, public space hotspots, underground facilities, etc.) and many remote outdoor locations. Small cells can also enable operators to meet the growing demand for mobile data, by extending the data capacity of the macro network at a fraction of the cost per gigabit (of macro base stations).

In some embodiments, the processor may calculate the skew and offset using an exponentially weighted moving average filter applied to said timestamps and said transmission rates by calculating the skew α as the average of the skew $\alpha_1$ calculated in the forward direction from master to slave and the skew $\alpha_2$ calculated in the reverse direction from the slave to the master:

$$\alpha_1 = \frac{(T_{1,n} - T_{1,n-1})}{(T_{2,n} - T_{2,n-1})} - 1 \ \& \ \alpha_2 = \frac{(T_{4,n} - T_{4,n-1})}{(T_{3,n} - T_{3,n-1})} - 1,$$

wherein $T_{1,n}$ is the time of departure of the nth Sync message as measured by the master clock; $T_{2,n}$ is the time of receipt as recorded by the slave clock on receipt of the nth Sync message; $T_{3,n}$ is the time of transmission of the nth Delay_Req message as recorded by the slave clock; $T_{4,n}$ is the time of receipt of the nth Delay_Req message as recorded by the master clock, and calculating the offset θ as $\theta=T_{1,n}-(1+\alpha)T_{2,n}+d+p_{ds}$, wherein: ξ is the ratio of the transmission rate from master to slave to the transmission rate from slave to master, $p_{ds}$ is the fixed physical link (or propagation) delay of the network between the master and the slave device; and $$d = \frac{(T_{4,n} - T_{1,n}) + (1+\alpha)(T_{2,n} - T_{3,n}) - (p_{ds} + p_{us})}{(1+\xi)},$$

wherein: $p_{us}$ is the fixed physical link delay of the network between the slave and the master device, and updates the offset and skew according to the update equations: $\hat{\alpha}_n = \mu\alpha_n + (1-\mu)\hat{\alpha}_{n-1}$, $0<\mu<1$ and $\hat{\theta}_n = \mu\theta_n + (1-\mu)\hat{\theta}_{n-1}$, $0<\mu<1$.

The exponentially weighted moving average filter is a simple linear approximation technique which allows account to be take of previous measurements when calculating the measurement of a quantity for the current time frame. By adjusting the parameter μ, the influence of previous calculations can be reduced or increased accordingly. For small values of μ, the offset and skew are dominated by the measurements at the current time. For larger values of μ, the offset and skew take greater account of previous values, which can smooth the running calculation of these values and reduce the effect of spikes in the instantaneous calculations.

In other embodiments, the processor may calculate the skew and offset using a Kalman filter to determine the skew $\alpha_n$ and the offset $\theta_n$ at time n, the Kalman filter being applied to: the state equation $$X_n = \begin{bmatrix} \theta_n \\ \alpha_n \end{bmatrix} = \begin{bmatrix} 1 & (T_{1,n} - T_{1,n-1}) \\ 0 & 1 \end{bmatrix} \begin{bmatrix} \theta_{n-1} \\ \alpha_{n-1} \end{bmatrix} + \begin{bmatrix} w_{\theta,n} \\ w_{\alpha,n} \end{bmatrix}$$

and to the measurement equation $y_n = D_n X_n + v_n$, wherein: $y_n = (1+\xi)(T_{1,n}-T_{2,n}+p_{ds}) + (T_{4,n}-T_{1,n}+T_{2,n}-T_{3,n}-p_{ds}-p_{us})$ is a scalar, $D_n = [(1+\iota) - [(T_{2,n}-T_{3,n})-(1+\xi)T_{2,n}]]$ is a 1×2 matrix, $X_n^T = [\theta_n \ \alpha_n]$ is a vector and $v_n = (\gamma_n - \xi\epsilon_n)$ is the measurement noise, and wherein: $T_{1,n}$ is the time of departure of the nth Sync message as measured by the master clock; $T_{2,n}$ is the time of receipt as recorded by the slave clock on receipt of the nth Sync message; $T_{3,n}$ is the time of transmission of the nth Delay_Req message as recorded by the slave clock; $T_{4,n}$ is the time of receipt of the nth Delay_Req message as recorded by the master clock; ξ is the ratio of the transmission rate from master to slave to the transmission rate from slave to master, $p_{ds}$ is the fixed physical link (or propagation) delay of the network between the master and the slave device; ε is the stochastic delay in the transmission of messages between the master and the slave device; $p_{us}$ is the fixed physical link delay of the network between the slave and the master device; and γ is the stochastic delay in the transmission of messages between the slave and the master device.

The Kalman filter allows measurements of a process observed over time, containing noise and other inaccuracies, to be used to produce values (estimates) that tend to be closer to the true values of the measurements and their associated calculated values.

The system of the present aspect may include any combination of some, all or none of the above described preferred and optional features.

At their broadest a second set of aspects of the present invention provide for synchronization of a slave clock to a master clock over a network with asymmetric transmission rates wherein the master and slave adjust the rate of transmission of timing messages so that they are identical in both directions.

A fourth aspect of the present invention provides a method of synchronising a slave clock in a slave device with a master clock in a master device, the master and slave device being connected by a network having asymmetric transmission rates, the method including the steps of: determining the maximum communication rate over said network between the slave and the master; exchanging timing messages between the master device and the slave device over said network and recording timestamps which are the times of sending and receiving said messages, wherein the rate of data transfer applied to said timing messages is restricted in both directions to a rate which is fixed by the master and the slave as less than said maximum communication rate; calculating the skew and offset of the slave clock compared to the master clock using said timestamps; and synchronizing said slave clock using said calculated offset and skew.

The method of this aspect is able to reduce or preferably eliminate delays arising as a result of rate asymmetry by causing the transfer rate for the timing messages to be identical in each direction, and therefore may result in a more accurate synchronization of the slave clock to the master clock.

The network may be a network operating under xDSL or GPON, and in particular may be part of an existing broadband infrastructure, where inherent asymmetries in the data transfer rate exist and may previously have hindered synchronization over such links. Such methods may find particular application in synchronization over existing broadband infrastructure, such as xDSL and GPON, where inherent asymmetries in the data transfer rate exist and may previously have hindered synchronization over such links.

In particular the method of the present aspect may improve the quality of the time distribution in such networks, allowing existing broadband (e.g., xDSL, GPON) infrastructure to be readily used for the backhaul for small cell base stations for mobile telecommunications. Small cells enable operators to provide a higher quality mobile signal where it was never previously economical and/or possible to install conventional base stations and radio network equipment, including indoor environments (e.g., residential apartments, malls, enterprises, public space hotspots, underground facilities, etc.) and many remote outdoor locations. Small cells can also enable operators to meet the growing demand for mobile data, by extending the data capacity of the macro network at a fraction of the cost per gigabit (of macro base stations).

Preferably only the rate of data transfer of the timing messages is restricted and other data is transferred at normal, unrestricted rates. This means that the restriction on data transfer rate imposed for timing messages does not affect the ability of the network to operate at its maximum capacity in the downstream direction when providing data to the slave device (and onward to other devices, such as mobile telephones, connected to the slave device).

In certain embodiments, the step of calculating the skew and offset uses an exponentially weighted moving average filter applied to said timestamps and said transmission rates.

In these embodiments, the step of calculating the skew and offset may calculate the skew α as the average of the skew $\alpha_1$ calculated in the forward direction from master to slave and the skew $\alpha_2$ calculated in the reverse direction from the slave to the master:

$$\alpha_1 = \frac{(T_{1,n} - T_{1,n-1})}{(T_{2,n} - T_{2,n-1})} - 1 \quad \& \quad \alpha_2 = \frac{(T_{4,n} - T_{4,n-1})}{(T_{3,n} - T_{3,n-1})} - 1,$$

wherein $T_{1,n}$ is the time of departure of the nth Sync message as measured by the master clock; $T_{2,n}$ is the time of receipt as recorded by the slave clock on receipt of the nth Sync message; $T_{3,n}$ is the time of transmission of the nth Delay_Req message as recorded by the slave clock; $T_{4,n}$ is the time of receipt of the nth Delay_Req message as recorded by the master clock, and calculates the offset θ as $\theta = T_{1,n} - (1+\alpha) T_{2,n} + d + p_{ds}$, wherein: $p_{ds}$ is the fixed physical link (or propagation) delay of the network between the master and the slave device; and $$d = \frac{(T_{4,n} - T_{1,n}) + (1+\alpha)(T_{2,n} - T_{3,n}) - (p_{ds} + p_{us})}{2},$$

wherein: $p_{us}$ is the fixed physical link delay of the network between the slave and the master device, and updates the offset and skew according to the update equations: $\hat{\alpha}_n = \mu \alpha_n + (1-\mu)\hat{\alpha}_{n-1}$, $0 < \mu < 1$ and $\hat{\theta} = \mu \theta_n + (1-\mu)\hat{\theta}_{n-1}$, $0 < \mu < 1$.

The exponentially weighted moving average filter is a simple linear approximation technique which allows account to be take of previous measurements when calculating the measurement of a quantity for the current time frame. By adjusting the parameter μ, the influence of previous calculations can be reduced or increased accordingly. For small values of μ, the offset and skew are dominated by the measurements at the current time. For larger values of μ, the offset and skew take greater account of previous values, which can smooth the running calculation of these values and reduce the effect of spikes in the instantaneous calculations.

In other embodiments, the step of calculating the skew and offset may use a Kalman filter.

In such embodiments, to determine the skew $\alpha_n$ and the offset $\theta_n$ at time n, the Kalman filter may be applied to: the state equation $$X_n = \begin{bmatrix} \theta_n \\ \alpha_n \end{bmatrix} = \begin{bmatrix} 1 & (T_{1,n} - T_{1,n-1}) \\ 0 & 1 \end{bmatrix} \begin{bmatrix} \theta_{n-1} \\ \alpha_{n-1} \end{bmatrix} + \begin{bmatrix} w_{\theta,n} \\ w_{\alpha,n} \end{bmatrix}$$

and to the measurement equation $y_n = D_n X_n + v_n$ wherein: $y_n = (T_{1,n} - T_{2,n}) + (T_{4,n} - T_{3,n}) + (p_{ds} - p_{us})$ is a scalar, $D_n = [2 \ (T_{2,n} + T_{3,n})]$ is a 1×2 matrix, $X_n^T = [\theta_n \ \alpha_n]$ is a vector and $v_n = (\gamma_n - \epsilon_n)$ is the measurement noise, and wherein: $T_{1,n}$ is the time of departure of the nth Sync message as measured by the master clock; $T_{2,n}$ is the time of receipt as recorded by the slave clock on receipt of the nth Sync message; $T_{3,n}$ is the time of transmission of the nth Delay_Req message as recorded by the slave clock; $T_{4,n}$ is the time of receipt of the nth Delay_Req message as recorded by the master clock; $p_{ds}$ is the fixed physical link (or propagation) delay of the network between the master and the slave device; ε is the stochastic delay in the transmission of messages between the master and the slave device; $p_{us}$ is the fixed physical link delay of the network between the slave and the master device; and γ is the stochastic delay in the transmission of messages between the slave and the master device.

The Kalman filter allows measurements of a process observed over time, containing noise and other inaccuracies, to be used to produce values (estimates) that tend to be closer to the true values of the measurements and their associated calculated values.

The method of the present aspect may include any combination of some, all or none of the above described preferred and optional features.

The method of the above aspects is preferably implemented by a system according to the fifth aspect of this invention, as described below, but need not be.

Further aspects of the present invention include computer programs for running on computer systems which carry out the method of the above aspect, including some, all or none of the preferred and optional features of that aspect.

A fifth aspect of the present invention provides a system including: a master device having a master clock and a first rate controller; a slave device having a slave clock, a processor and a second rate controller; and a network connecting said master device and said slave device and having asymmetric transmission rates, wherein the system is arranged to: estimate or determine the maximum communication rate over said network between the slave and the master; and determine a timing message exchange rate which is a rate which is less than said maximum communication rate; the master and slave devices are arranged to: exchange timing messages between the master device and the slave device over said network and recording timestamps which are the times of sending and receiving said messages, wherein the first and second rate controller restrict the rate of data transfer of said timing messages to said timing message exchange rate; and the processor is arranged to: calculate the skew and offset of the slave clock compared to the master clock using said timestamps; and synchronize said slave clock using said calculated offset and skew.

The system of this aspect is able to reduce or preferably eliminate delays arising as a result of rate asymmetry by causing the transfer rate for the timing messages to be identical in each direction, and therefore may result in a more accurate synchronization of the slave clock to the master clock.

The network may be a network operating under xDSL or GPON, and in particular may be part of an existing broadband infrastructure, where inherent asymmetries in the data transfer rate exist and may previously have hindered synchronization over such links.

In particular the slave device may provide improved synchronization in such networks compared to previous devices. The slave device may be a small cell base station for mobile telecommunications, or connected to a small cell base station, thereby allowing existing broadband (e.g., xDSL, GPON) infrastructure to be readily used for the backhaul for such small cell base stations. Small cells enable operators to provide a higher quality mobile signal where it was never previously economical and/or possible to install conventional base stations and radio network equipment, including indoor environments (e.g., residential apartments, malls, enterprises, public space hotspots, underground facilities, etc.) and many remote outdoor locations. Small cells can also enable operators to meet the growing demand for mobile data, by extending the data capacity of the macro network at a fraction of the cost per gigabit (of macro base stations).

Preferably only the rate of data transfer of the timing messages is restricted and other data is transferred at normal, unrestricted rates. This means that the restriction on data transfer rate imposed for timing messages does not affect the ability of the network to operate at its maximum capacity in the downstream direction when providing data to the slave device (and onward to other devices, such as mobile telephones, connected to the slave device).

In certain embodiments, the processor may calculate the skew and offset using an exponentially weighted moving average filter applied to said timestamps and said transmission rates by calculating the skew $\alpha$ as the average of the skew $\alpha_1$ calculated in the forward direction from master to slave and the skew $\alpha_2$ calculated in the reverse direction from the slave to the master:

$$\alpha_1 = \frac{(T_{1,n} - T_{1,n-1})}{(T_{2,n} - T_{2,n-1})} - 1 \quad \& \quad \alpha_2 = \frac{(T_{4,n} - T_{4,n-1})}{(T_{3,n} - T_{3,n-1})} - 1,$$

wherein $T_{1,n}$ is the time of departure of the nth Sync message as measured by the master clock; $T_{2,n}$ is the time of receipt as recorded by the slave clock on receipt of the nth Sync message; $T_{3,n}$ is the time of transmission of the nth Delay_Req message as recorded by the slave clock; $T_{4,n}$ is the time of receipt of the nth Delay_Req message as recorded by the master clock, and calculates the offset $\theta$ as $\theta = T_{1,n} - (1+\alpha) T_{2,n} + d + p_{ds}$, wherein: $p_{ds}$ is the fixed physical link (or propagation) delay of the network between the master and the slave device; and $$d = \frac{(T_{4,n} - T_{1,n}) + (1 + \alpha)(T_{2,n} - T_{3,n}) - (p_{ds} + p_{us})}{2},$$

wherein: $p_{us}$ is the fixed physical link delay of the network between the slave and the master device, and updates the offset and skew according to the update equations: $\hat{\alpha}_n = \mu \alpha_n + (1-\mu)\hat{\alpha}_{n-1}$, $0 < \mu < 1$ and $\hat{\theta}_n = \mu \theta_n + (1-\mu)\hat{\theta}_{n-1}$, $0 < \mu < 1$.

The exponentially weighted moving average filter is a simple linear approximation technique which allows account to be take of previous measurements when calculating the measurement of a quantity for the current time frame. By adjusting the parameter $\mu$, the influence of previous calculations can be reduced or increased accordingly. For small values of $\mu$, the offset and skew are dominated by the measurements at the current time. For larger values of $\mu$, the offset and skew take greater account of previous values, which can smooth the running calculation of these values and reduce the effect of spikes in the instantaneous calculations.

In other embodiments, the processor may calculate the skew and offset using a Kalman filter to determine the skew $\alpha_n$ and the offset $\theta_n$ at time n, the Kalman filter being applied to: the state equation $$X_n = \begin{bmatrix} \theta_n \\ \alpha_n \end{bmatrix} = \begin{bmatrix} 1 & (T_{1,n} - T_{1,n-1}) \\ 0 & 1 \end{bmatrix} \begin{bmatrix} \theta_{n-1} \\ \alpha_{n-1} \end{bmatrix} + \begin{bmatrix} w_{\theta,n} \\ w_{\alpha,n} \end{bmatrix}$$

and to the measurement equation $y_n = D_n X_n + v_n$ wherein: $y_n = (T_{1,n} - T_{2,n}) + (T_{4,n} - T_{3,n}) + (p_{ds} - p_{us})$ is a scalar, $D_n = [2 \ (T_{2,n} + T_{3,n})]$ is a 1×2 matrix, $X_n^T = [\theta_n \ \alpha_n]$ is a vector and $v_n = (\gamma_n - \epsilon_n)$ is the measurement noise, and wherein: $T_{1,n}$ is the time of departure of the nth Sync message as measured by the master clock; $T_{2,n}$ is the time of receipt as recorded by the slave clock on receipt of the nth Sync message; $T_{3,n}$ is the time of transmission of the nth Delay_Req message as recorded by the slave clock; $T_{4,n}$ is the time of receipt of the nth Delay_Req message as recorded by the master clock; $p_{ds}$ is the fixed physical link (or propagation) delay of the network between the master and the slave device; $\epsilon$ is the stochastic delay in the transmission of messages between the master and the slave device; $p_{us}$ is the fixed physical link delay of the network between the slave and the master device; and $\gamma$ is the stochastic delay in the transmission of messages between the slave and the master device.

The Kalman filter allows measurements of a process observed over time, containing noise and other inaccuracies, to be used to produce values (estimates) that tend to be closer to the true values of the measurements and their associated calculated values.

The system of the present aspect may include any combination of some, all or none of the above described preferred and optional features.

The xDSL Synchronization Scenario

Backhaul technologies such as xDSL or GPON, are inherently asymmetrical in transmission rates, and thus will require some form of transmission rate asymmetry compensation (in addition to other existing path asymmetries) in order to deliver accurate time synchronization. Thus, if time synchronization has to be delivered over such backhaul networks with asymmetrical delay on upstream and downstream, the level of asymmetry has to be accurately identified and proper compensation must be applied to avoid a time offset at the packet slave clock.

The transmission rate asymmetry issue (in addition to other path asymmetries) in xDSL and GPON makes the distribution of synchronization signals from a central Grand-Master (GM) located somewhere in the core network right to the small cells attached to the head-end or aggregation point (e.g., DSLAM) problematic. Services demanding the most stringent time synchronization requirements may mandate that all intermediate network elements offer some kind of on-path PTP support (via capabilities such as Boundary Clocks (BCs) or Transparent Clocks (TCs)) in order to minimize end-to-end Packet Delay Variation (PDV) and guarantee the high quality of synchronization required by base stations. Thus, deploying a GM at a central site to transmit synchronization signals across the entire backhaul network to all remote base stations may require an upgrade of a large number of intermediate network elements to facilitate IEEE 1588 message propagation.

Figure 3:
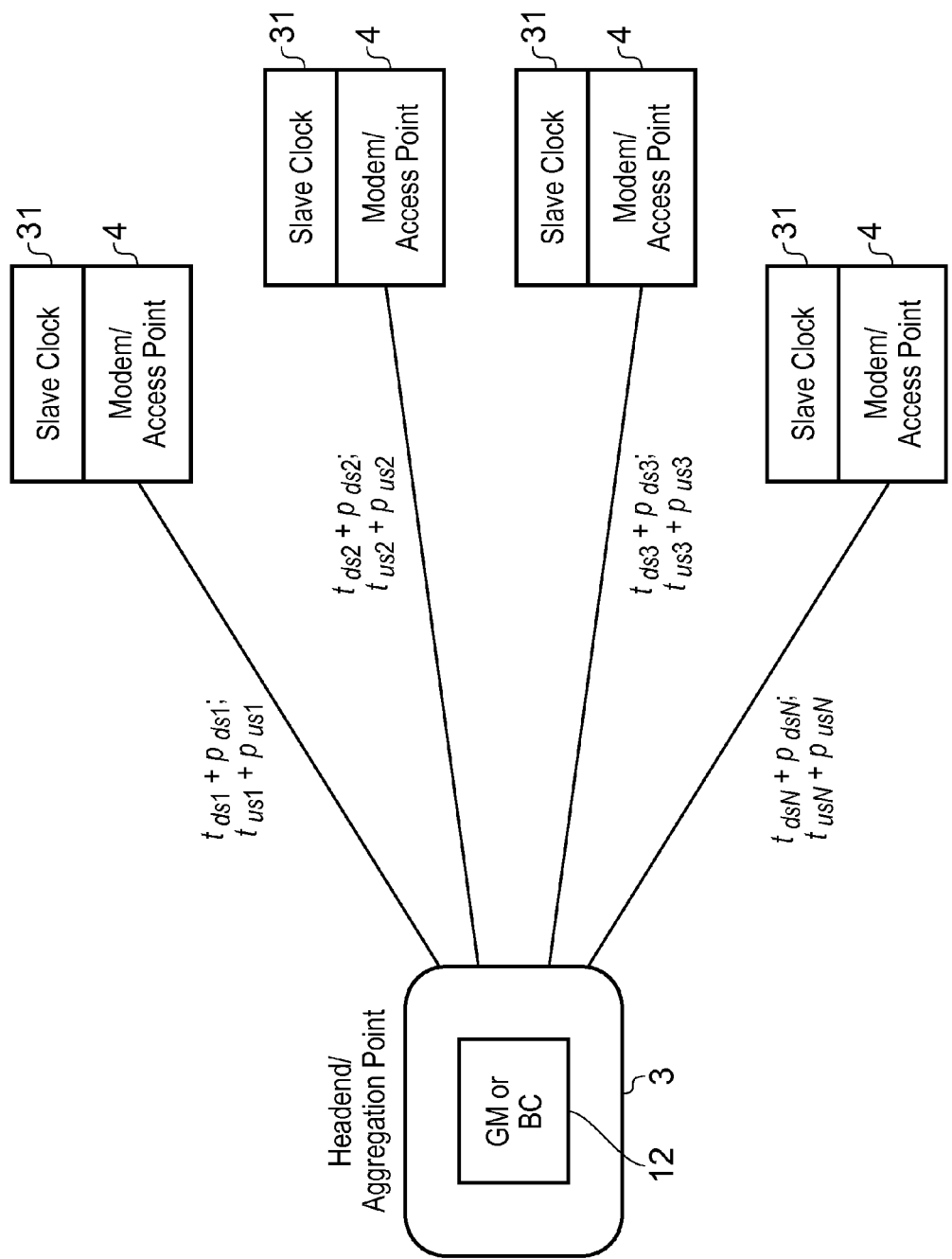
FIG. 3 shows a schematic arrangement of access points connected to a headend and the asymmetric delays over those connections.

End-to-end (E2E) time transfer by itself even over communication paths with no transmission rate asymmetry issues is challenging. Adding transmission rate asymmetry in this E2E time transfer scenario makes the problem even much more challenging. For these reasons, a much acceptable approach is to incorporate or collocate a BC or GM at the headend or aggregation point (i.e., DSLAM) which most likely will be located in the exchange (see FIG. 1 and FIG. 3). A more advanced solution could even have the GM or BC incorporated into headend or aggregation point device and also equipped with a built-in GPS receiver. In FIG. 1 and FIG. 3, each GM or BC services a relatively small number of PTP-slave devices in the base stations when compared to the case when a core GM is used. The GM or BC deployed at the first aggregation point, closest to the cell-site or a cluster of small cells, will not take up space at the base stations, and since they will typically be situated much closer to the base stations than a centralized GM would be (smaller time distribution chain), they can provide an accurate reference clock for the base stations and at the same time avoid a single point of failure as would be in the centralized GM case.

In a small cell backhaul and synchronization scenario, for example, over xDSL or GPON, positioning the GM or BC closer to headend or aggregation point reduces the risk of a catastrophic clock infrastructure failure. In this scenario, the number of hops between the GM or BC and slave clock in the base station is typically point-to-point or just a few hops. This reduces the risk of clock infrastructure failures, reduces PDV and asymmetry (i.e., physical link asymmetry), all of which negatively effect the synchronization accuracy. This arrangement also reduces (or possibly eliminates) the number of nodes (between GM/BC and slave clock) that would need upgrade to BC/TC functionality where tighter synchronization is needed when IEEE 1588 is deployed.

FIG. 3 shows a typical network in which systems and methods according to embodiments of the present invention may be deployed or used. In FIG. 3 a BC (instead of a GM) 12 is provided at the headend or aggregation point 3 in the time distribution path between the core GM and the PTP-slave clock 31 in the base stations 4 and splits the PTP distribution chain into two parts (e.g., core/aggregation and access). Here the BC 12 terminates the time information after the core, dealing with PDV introduced on that section only. The regenerated PTP flow then traverses the access, terminated by the PTP-slave 31 within the base station 4 that may need to mitigate PDV and other path delay asymmetries introduced by the access only. Such a scheme with a BC 12 in the headend/aggregation point 3 can allow better PTP end-to-end performance than the pure E2E case where time transfer goes directly from the core GM to PTP-slave 4.

Figure 4:
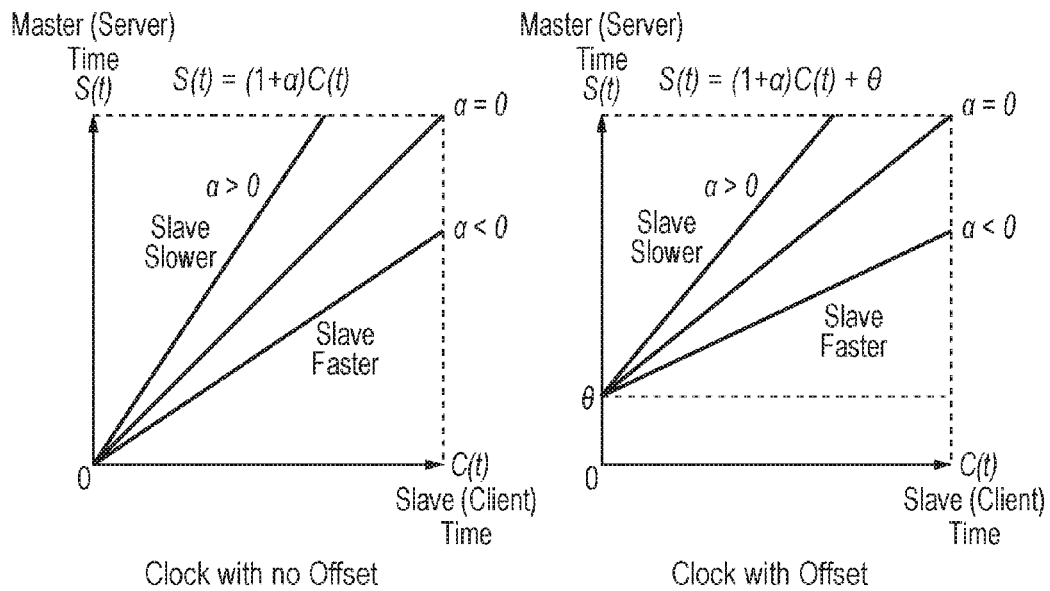
FIG. 4 illustrates a basic clock model.

In order to examine the synchronization problem further and propose solutions a generalized clock offset and skew equation is defined. It is assumed that, at any particular time instant, the instantaneous view of the relationship between the master (server) clock with timeline S(t) and the slave (client) clock with timeline C(t), can be described by the well-known simple skew clock model depicted in FIG. 4, and described by the equation, $$S(t) = (1+\alpha)C(t) + \theta, \quad (1)$$

where $\theta$ is the time offset and $\alpha$ is the skew (frequency offset) which is a very small quantity in the order of parts-per-million. This snapshot is an instantaneous view of how well the two clocks are (mis)aligned. FIG. 4 illustrates the influence of $\theta$ and $\alpha$ on the alignment.

Now consider the network configuration in FIG. 3 and assume that synchronization messages (see FIG. 2) are being exchanged between a master in the headend/aggregation point and a slave at the modem/access point end. The above equation can be extended to account for the case where the master clock and slave clock exchange messages over a communication link with delay. If can be assumed that the nth Sync message traveling from the master to the slave (downstream direction) experiences a transmission delay of $t_{ds}$ plus a fixed physical link (or propagation) delay of $p_{ds}$.

Similarly, it is assumed that the nth Delay_Req message sent from the slave to the master (upstream direction) experiences a transmission delay of $t_{us}$ plus a fixed propagation delay of $p_{us}$. An asymmetric path exists when the delay components in the two directions are unequal. It is assumed that the physical link delay (which can consist of wire/fiber delays, and internal device signal path and processing delays (i.e., chip, board, and board-to-board level delays)) is manually calibrated (as described in [1]) or known through other means. Current industry practices (see ITU-T Rec. G.8271) involve manual calibration of all of these types of delays.

The transmission delay, on the other hand, is inversely proportional to the transmission rate (speed). The master to slave (downstream direction) transmission rate is defined as $S_{ds} \propto 1/t_{ds}$ and the slave to master (upstream direction) transmission rate as $S_{us} \propto 1/t_{us}$. From this the following speed relationship can be defined:

$$\frac{S_{ds}}{S_{us}} = \frac{t_{us}}{t_{ds}} \quad (2)$$

If d is defined as an arbitrarily chosen delay and it is assumed that $t_{ds} = d$, then it is possible to assume $t_{us} = \xi d$, where $\xi > 0$ is a multiplicative factor (which we call a speed ratio) that relates $t_{ds}$ and $t_{us}$. With this, the equation above simplifies to the following expression $$\frac{S_{ds}}{S_{us}} = \frac{t_{us}}{t_{ds}} = \frac{\xi d}{d} = \xi \quad (3)$$

The speed ratio $\xi$ can easily be computed if the downstream speed $S_{ds}$ and upstream speed $S_{us}$ are known or can be estimated. These speeds are the transmission speeds of PTP messages on the communication medium linking the master and slave clocks.

Figure 2:
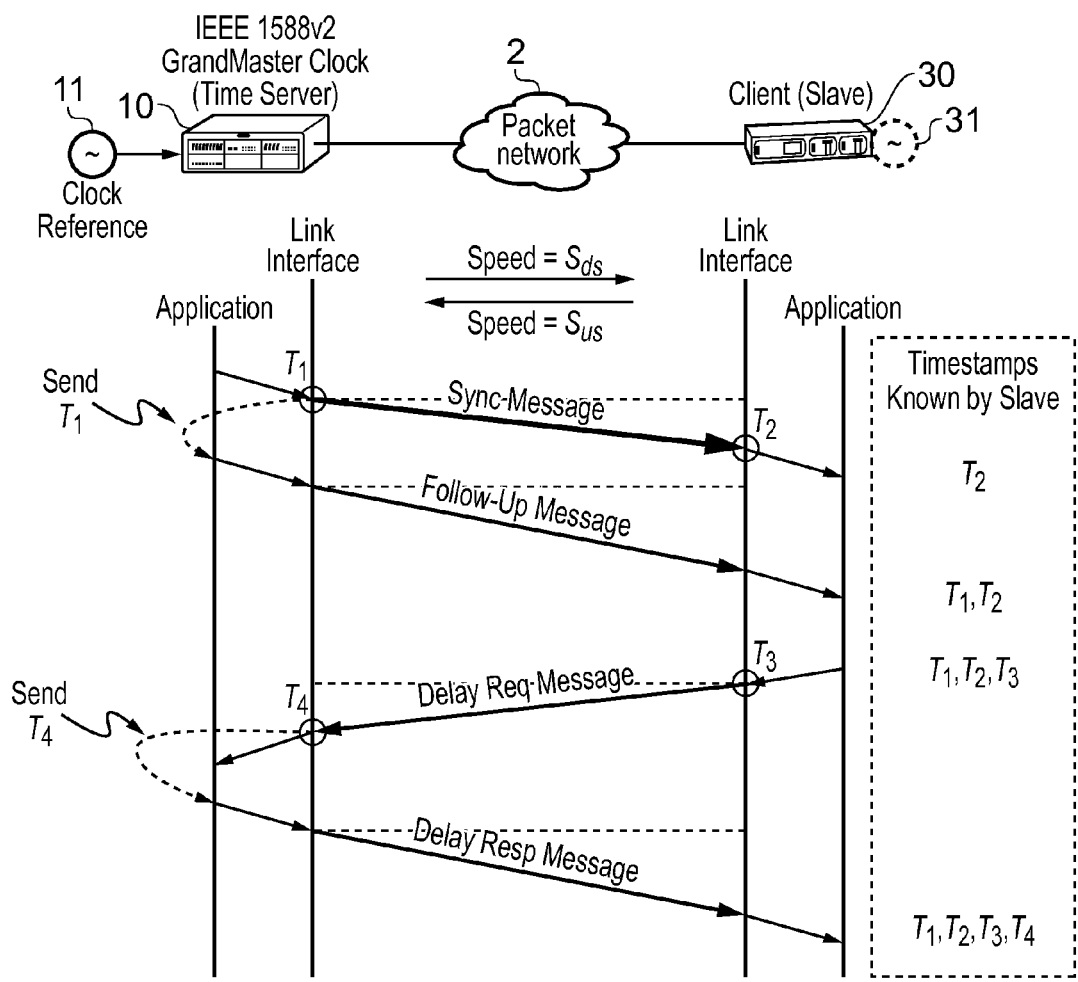
FIG. 2 shows the typical timing message exchange under IEEE 1588 PTP for a two-step clock and has already been described.

The master and slave exchange messages using the delay-request delay-response mechanism described in FIG. 2. For the nth Sync message which departs the master with timestamp $T_{1,n} \in S(t)$ and arrives at the slave with timestamp $T_{2,n} \in C(t)$ after having experienced delays of $t_{ds} = d$ and $p_{ds}$, the simple skew clock model above can be extended to account for the travel time to obtain the following expression $$(T_{1,n} + d + p_{ds}) = (1+\alpha)T_{2,n} + \theta \quad (4)$$

For the nth Delay_Req message which departs the slave with timestamp $T_{3,n} \in C(t)$ and arrives at the master with timestamp $T_{4,n} \in S(t)$ after having experienced delays of $t_{us} = \xi d$ and $p_{us}$, the following expression is obtained:

$$(T_{4,n} - \xi d - p_{us}) = (1+\alpha)T_{3,n} + \theta \quad (5)$$

A key assumption here is that the message exchanges occur over a period of time so small that the offset $\theta$ and skew $\alpha$ can be assumed constant over that period. The effects of the offset and skew on the master-slave clock alignment illustrated in FIG. 4.

Handling Link Bandwidth Asymmetry Using Link Rate Information at the Slave

In this section sets out some techniques for estimating the offset $\theta$ and $\alpha$ using Sync and Delay_Req message exchanges as illustrated by the PTP message exchange process in FIG. 2 which are used in embodiments of the present invention.

Simple Linear Approximation Technique for Offset and Skew Estimation

In certain embodiments, the clock offset and skew can be calculated using a simple linear approximation technique.

Starting from the equations above and subtracting (5) from (4) gives $$(T_{1,n} - T_{4,n}) + (1+\xi)d + (p_{ds} + p_{us}) = (1+\alpha)(T_{2,n} - T_{3,n}) \quad (6)$$

And, rearranging this expression for d:

$$d = \frac{(T_{4,n} - T_{1,n}) + (1 + \alpha)(T_{2,n} - T_{3,n}) - (p_{ds} + p_{us})}{(1 + \xi)} \quad (7)$$

From (4) the clock offset θ can be expressed as $$\theta = T_{1,n} - (1+\alpha)T_{2,n} + d + p_{ds} \quad (8)$$

Thus, knowing α and ξ, d can be calculated using (7) and subsequently θ can be calculated using (8).

It remains to calculate or estimate the skew α which can be done using the Sync and Delay_Req messages.

Let $\alpha_1$ denote the component of the skew that can be estimated from the Sync message exchange. For the (n−1) and nth Sync message exchange (4) provides the following $$(T_{1,n-1} + d + p_{ds}) = (1+\alpha_1)T_{2,n-1} + \theta \quad (9)$$

$$(T_{1,n} + d + p_{ds}) = (1+\alpha_1)T_{2,n} + \theta \quad (10)$$

Subtracting (9) from (10), gives $$(T_{1,n} - T_{1,n-1}) = (1 + \alpha_1)(T_{2,n} - T_{2,n-1}) \quad (11)$$

$$\alpha_1 = \frac{(T_{1,n} - T_{1,n-1})}{(T_{2,n} - T_{2,n-1})} - 1 \quad (12)$$

Let $\alpha_2$ denote the component of the skew that can be estimated from the Delay_Req message exchange. For the (n−1) and nth Delay_Req message exchange (5) provides the following $$(T_{4,n-1} - \xi d - p_{us}) = (1+\alpha_2)T_{3,n-1} + \theta \quad (13)$$

$$(T_{4,n} - \xi d - p_{us}) = (1+\alpha_2)T_{3,n} + \theta \quad (14)$$

Subtracting (13) from (14), gives $$(T_{4,n} - T_{4,n-1}) = (1 + \alpha_2)(T_{3,n} - T_{3,n-1}) \quad (15)$$

$$\alpha_2 = \frac{(T_{4,n} - T_{4,n-1})}{(T_{3,n} - T_{3,n-1})} - 1 \quad (16)$$

The skew α can then be estimated from $\alpha_1$ and $\alpha_2$ as $$\alpha = \frac{\alpha_1 + \alpha_2}{2} \quad (17)$$

The estimated skew α is then used to compute the delay d and then clock offset θ in time interval n as given in (7) and (8), respectively. To compute the server time estimate (Ŝ), filtered values of the clock offset (θ̂) and skew (α̂) preferably should be used. The filtering can be done using a simple exponentially weighted moving average (EWMA) filter as follows:

$$\hat{\alpha}_n = \mu\alpha_n + (1-\mu)\hat{\alpha}_{n-1}, 0 < \mu < 1 \quad (18)$$

$$\hat{\theta}_n = \mu\theta_n + (1-\mu)\hat{\theta}_{n-1}, 0 < \mu < 1 \quad (19)$$

Then from (1) the server (master) time estimate can be obtained as follows:

$$\hat{S}_n = (1+\hat{\alpha}_n)C_n + \hat{\theta}_n \quad (20)$$

Figure 5:
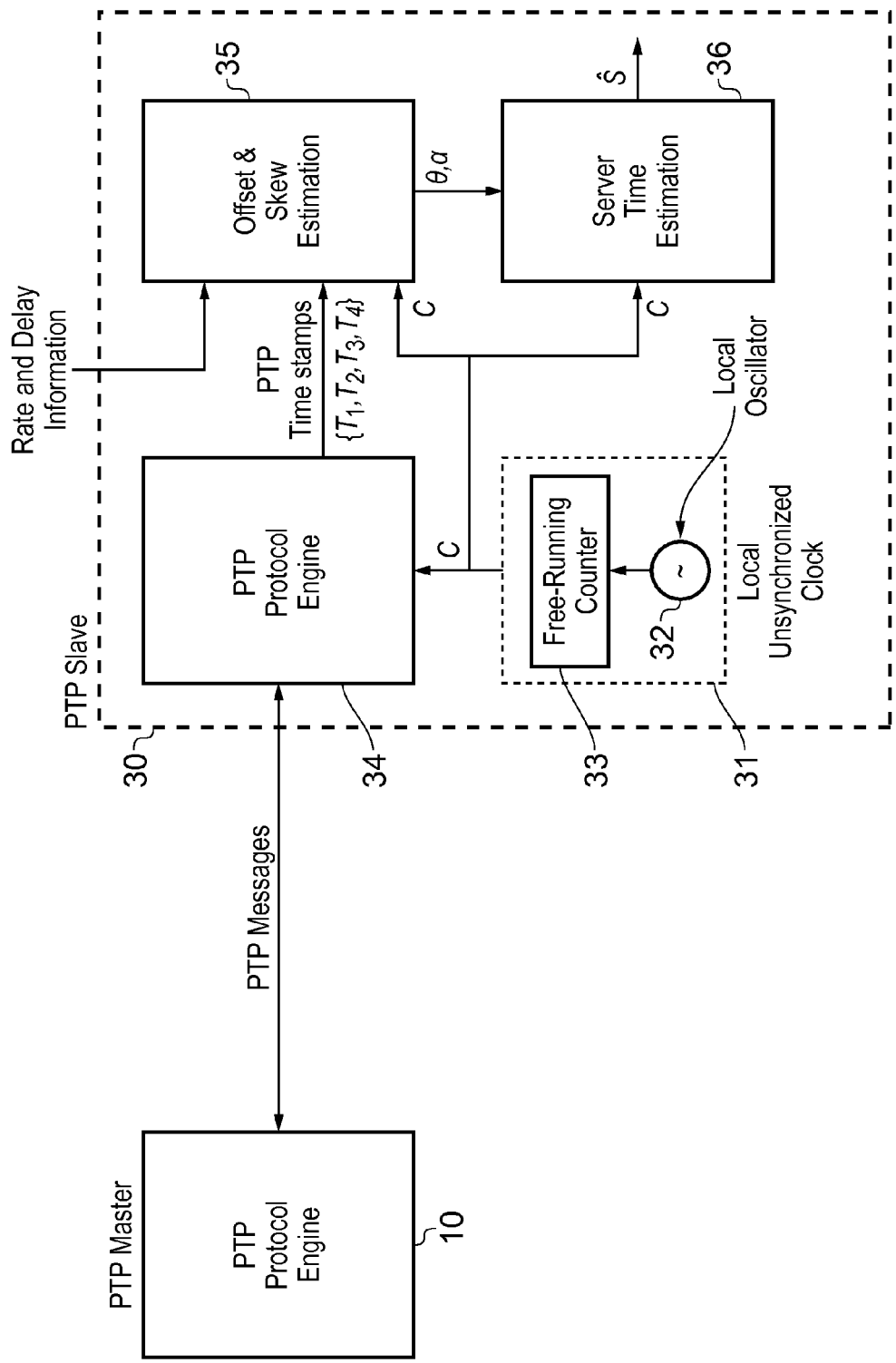
FIG. 5 shows, in schematic form, the processing of timing messages and clock synchronization by a slave device according to an embodiment of the present invention.

We denote $C_n$ in (20) as the current reading of the slave's local free-running clock 31 (i.e., the local unsynchronized clock) as shown in FIG. 5.

FIG. 5 shows, schematically, the processing of PTP messages in a slave device 30 according to an embodiment of the present invention. The slave device 30 receives PTP messages from a PTP master 10. The slave has a local free-running clock 31 made up of a local oscillator 32 and a free-running counter 33. The timing signal from the clock 31 is provided to each of a PTP protocol engine 34, an offset and skew estimation unit 35 and a server time estimation unit or synchronizer 36.

The PTP protocol engine 34 receives and handles the PTP message exchange between the slave 30 and the master 10, including timestamping incoming PTP messages, extracting timestamps from said messages and passing said timestamps to the offset and skew estimation unit 35. The PTP protocol engine 34 may operate under either the one-step or two-step PTP protocol.

The offset and skew estimation unit 35 receives PTP timestamps from the PTP protocol engine 34 as well as rate and other delay information from the network elements (not shown) in the slave 30. Based on this information, the offset and skew estimation unit calculates a current estimation of the offset and skew of the slave clock 31 compared to the clock in the PTP master 10. Various methods for performing this calculation are set out the embodiments of the present invention.

The server time estimation unit 36 uses the offset and skew estimated by the offset and skew estimation unit 35 to update the output of the slave clock 31 and provides this estimate of the master time to other functions in the slave device 30.

Kalman Filter Based Technique for Offset and Skew Estimation

In alternative embodiments, a Kalman filter based technique can be used to estimate the clock offset and skew. The rate and delay asymmetries discussed above are still considered here. The Kalman filter [2] allows measurements of a process observed over time, containing noise and other inaccuracies, to be used to produce values (estimates) that tend to be closer to the true values of the measurements and their associated calculated values. The Kalman filter produces estimates of the true values of measurements and their associated calculated values by predicting a value, estimating the uncertainty of the predicted value, and computing a weighted average of the predicted value and the measured value.

In order to use the Kalman filter (to estimate the internal state of a process given only a sequence of noisy observations), the process must be modelled in accordance with the framework of the Kalman filter. Consider a state-space model described by the following pair of equations State Equation: $X_n = A_n X_{n-1} + w_n$, (21)

Measurement Equation: $y_n = D_n X_n + v_n$, (22)

where n is a nonnegative time index, $A_n$ is a known M-by-M state transition matrix, $X_n$ is the M-dimensional state (or parameter) vector, $w_n$ is an M-dimensional process noise vector which is assumed to be drawn from a zero mean multivariate normal distribution with covariance $Q_n = E[w_n w_n^T]$, $w_n \sim N(0, Q_n)$, $y_n$ is the measurement, $D_n$ is a known 1×M-dimensional measurement matrix which maps the true state space into the measurement space, $v_n$ is the measurement noise which is assumed to be zero mean Gaussian white noise with covariance $R_n = E[v_n v_n^T]$, $v_n \sim N(0, R_n)$, and T denotes transpose. It is assumed in the model that the initial state, and the noise vectors at each step $\{X_0, w_1, \ldots, w_n, v_1, \ldots, v_n\}$ are mutually independent.

The notation $\hat{X}_{n,m}$ used below represents the estimate of X at time n given observations up to, and including at time m. The Kalman filter equation are most often conceptualized as two distinct phases: Predict and Update as described below.

Predict Phase:

The predict phase uses the state estimate from the previous time step to produce an estimate of the state at the current time step.

Predicted (a priori) state estimate:

$$\hat{X}_{n,n-1} = A_n \hat{X}_{n-1,n-1} \quad (23)$$

This predicted state estimate is also known as the a priori state estimate because, although it is an estimate of the state at the current time step, it does not include observation information from the current time step.

Predicted (a priori) estimate covariance:

$$P_{n,n-1} = A_n P_{n-1,n-1} A_n^T + Q_n \quad (24)$$

Update Phase:

In the update phase, the current a priori prediction is combined with current observation information to refine the state estimate. This improved estimate is termed the a posteriori state estimate.

Innovation or measurement residual:

$$\tilde{z}_n = y_n - D_n \hat{X}_{n,n-1} \quad (25)$$

Innovation (or residual) covariance:

$$S_n = D_n P_{n,n-1} D_n^T + R_n \quad (26)$$

Optimal Kalman gain:

$$K_n + P_{n,n-1} D_n^T S_n^{-1} = P_{n,n-1} D_n^T [D_n P_{n,n-1} D_n^T + R_n]^{-1} \quad (27)$$

Updated (a posteriori) state estimate:

$$\hat{X}_{n,n} = \hat{X}_{n,n-1} + K_n \tilde{z}_n = \hat{X}_{n,n-1} + K_n(y_n - D_n \hat{X}_{n,n-1}) \quad (28)$$

This is the a posteriori state estimate at time n given observations up to and including at time n. The second term in the above equation is called the correction term and it represents the amount by which to correct the propagated state estimate due to our measurement. Inspection of the Kalman gain equation shows that if the measurement noise is large, $R_n$ will be large, so that $K_n$ will be small and we would not give much credibility to the measurement y when computing the next $\hat{X}$. On the other hand, if the measurement noise is small, $R_n$ will be small, so that $K_n$ will be large and we will give a lot of credibility to the measurement when computing the next $\hat{X}$.

Updated (a posteriori) estimate covariance:

$$P_{n,n} = (I - K_n D_n) P_{n,n-1} \quad (29)$$

This is the a posteriori error covariance matrix (a measure of the estimated accuracy of the state estimate).

Typically, the two phases alternate, with the prediction advancing the state until the next scheduled observation, and the update incorporating the observation. Practical implementation of the Kalman Filter requires getting a good estimate of the noise covariance matrices $Q_n$ and $R_n$.

Development of the Measurement Equation

It can be assumed that a Sync message sent from a master to a slave experiences a transmission delay of $t_{ds}$ plus a fixed physical link (or propagation) delay of $p_{ds}$ plus a stochastic delay $\epsilon$ (to account for all other delay components in the system). Similarly, it can be assumed that a Delay_Req message sent from the slave to the master experiences a transmission delay of $t_{us}$ plus a fixed propagation delay of $p_{us}$ plus a variable stochastic delay $\gamma$. Let the variables $\theta_n$ and $\alpha_n$ denote the offset and skew during the nth Sync message exchange. Equations (4) and (5) above can then be rewritten to account for the above conditions with the following equations $$(T_{1,n} + d + p_{ds} + \epsilon_n) = (1 + \alpha_n) T_{2,n} + \theta_n \quad (30)$$

$$(T_{4,n} - \xi d - p_{us} - \gamma_n) = (1 + \alpha_n) T_{3,n} + \theta_n \quad (31)$$

Subtracting (31) from (30) gives $$(T_{1,n} - T_{4,n}) + (1+\xi)d + (p_{ds} + p_{us}) + (\epsilon_n + \gamma_n) = (1+\alpha_n)(T_{2,n} - T_{3,n}) \quad (32)$$

Rearranging this expression gives $$d = \frac{(T_{4,n} - T_{1,n}) + (1 + \alpha_n)(T_{2,n} - T_{3,n}) - (p_{ds} + p_{us}) - (\epsilon_n + \gamma_n)}{(1 + \xi)} \quad (33)$$

From (30) the clock offset $\theta_n$ can be expressed as $$\theta = T_{1,n}(1 + \alpha_n) T_{2,n} + d + p_{ds} + \epsilon_n \quad (34)$$

Substituting (33) in (34) gives $$\theta_n = T_{1,n} - (1 + \alpha_n) T_{2,n} + p_{ds} + \epsilon_n + \left[ \frac{(T_{4,n} - T_{1,n}) + (1 + \alpha_n)(T_{2,n} - T_{3,n}) - (p_{ds} + p_{us}) - (\epsilon_n + \gamma_n)}{(1 + \xi)} \right] \quad (35)$$

Rearranging this equation gives the measurement equation as $$(1+\xi)(T_{1,n} - T_{2,n} + p_{ds}) + (T_{4,n} - T_{1,n} + T_{2,n} - T_{3,n} - p_{ds} - p_{us}) = (1+\xi)\theta_n - \alpha_n[(T_{2,n} - T_{3,n}) - (1+\epsilon)T_{2,n}] + (\gamma_n - \xi\epsilon_n) \quad (36)$$

The above equation is of the form of equation (22) where n is a nonnegative time index,
$y_n = (1+\xi)(T_{1,n} - T_{2,n} + p_{ds}) + (T_{4,n} - T_{1,n} + T_{2,n} - T_{3,n} - p_{ds} - p_{us})$ is a scalar,
$D_n = [(1+\xi) - [(T_{2,n} - T_{3,n}) - (1+\xi)T_{2,n}]]$ is a 1×2 matrix,
$X_n^T = [\theta_n \; \alpha_n]$ is a vector and
$v_n = (\gamma_n - \xi\epsilon_n)$ is the measurement noise.

The above more generalized equation allows for known delays and asymmetries to be accounted for in the Kalman Filter formulation. The nth sampling interval is considered to be the period in which the nth Sync and nth Delay_Req messages exchanges occur.

Development of the State (Process) Equation

Next the clock (process) model parameters A and $w_n$ are derived. The clock skew between two points $T_{1,n}$ and $T_{1,n-1}$ can be estimated given two clock offsets $\theta_n$ and $\theta_{n-1}$ as $$\alpha_{n-1} = \frac{\theta_n - \theta_{n-1}}{T_{1,n} - T_{1,n-1}}. \quad (37)$$

The process dynamics for the clock while accounting for process noise can be expressed as as $$\theta_n = \theta_{n-1} + \alpha_{n-1}(T_{1,n} - T_{1,n-1}) + w_{\theta,n}$$

$$\alpha_n = \alpha_{n-1} + w_{\alpha,n} \quad (38)$$

$w_n^T = [w_{\theta,n} \; w_{\alpha,n}]$ can be defined as the process noise vector which is assumed to be drawn from a zero mean normal distribution with covariance $Q_n = E[w_n w_n^T]$. The system can be described by the following two-state dynamic model $$X_n = \begin{bmatrix} \theta_n \\ \alpha_n \end{bmatrix} = \begin{bmatrix} 1 & (T_{1,n} - T_{1,n-1}) \\ 0 & 1 \end{bmatrix} \begin{bmatrix} \theta_{n-1} \\ \alpha_{n-1} \end{bmatrix} + \begin{bmatrix} w_{\theta,n} \\ w_{\alpha,n} \end{bmatrix} + AX_{n-1} + w_n, \quad (39)$$

where $A_n$ is the known 2-by-2 state transition matrix. If the time between Sync messages is fixed, then, $\Delta T_n = (T_{1,n} - T_{1,n-1}) = \Delta t$ is a constant term, and $$A = \begin{bmatrix} 1 & (T_{1,n} - T_{1,n-1}) \\ 0 & 1 \end{bmatrix} = \begin{bmatrix} 1 & \Delta t \\ 0 & 1 \end{bmatrix}. \quad (40)$$

The clock offset ($\hat{\theta}$) and skew ($\hat{\alpha}$) estimated at the client using either of the above techniques can be used to compute the server time $\hat{S}$ as given in equation (20) and FIG. 5.

As noted in [3], the Kalman filter model includes as special cases many common estimation techniques. One example of such techniques is the multiple regression approach. This approach to estimation assumes that a time series $\{y_n\}$ is well approximated by $y_n = D_n X_n + v_n$, where $D_n$ is an 1×M-dimensional matrix of the independent regression variables, X is an M-dimensional vector of (constant) regression weights, and $v_n$ is an error term. The Kalman filter model is obtained by allowing the regression coefficients to depend on n and by adding the dynamics relation $$X_n = X_{n-1} \quad (41)$$

With this formulation, the matrix A becomes identity matrix $$A = \begin{bmatrix} 1 & 0 \\ 0 & 1 \end{bmatrix} \quad (42)$$

This (multiple regression approach [3]) formulation of the state (process) equation and matrix in (41) and (42), respectively, when used together with the measurement equation in (36) has been implemented and tested and found to work as well as the formulation in (40).

ADSL Implementation Scenario

The speed ratio for the simple linear method and the Kalman filter formulation can be obtained from the rate information discussed below. Here, the synchronization problem with rate asymmetry is described in the context of ADSL (Asymmetric DSL) but the skilled person will appreciate that the ideas here are applicable to many other DSL variants.

ADSL enables faster data transmission over copper telephone lines than a conventional voiceband modem can provide. It does this by utilizing frequencies that are not used by a voice telephone call. A splitter, or DSL filter, allows a single telephone connection to be used for both ADSL service and voice calls at the same time.

Figure 6:
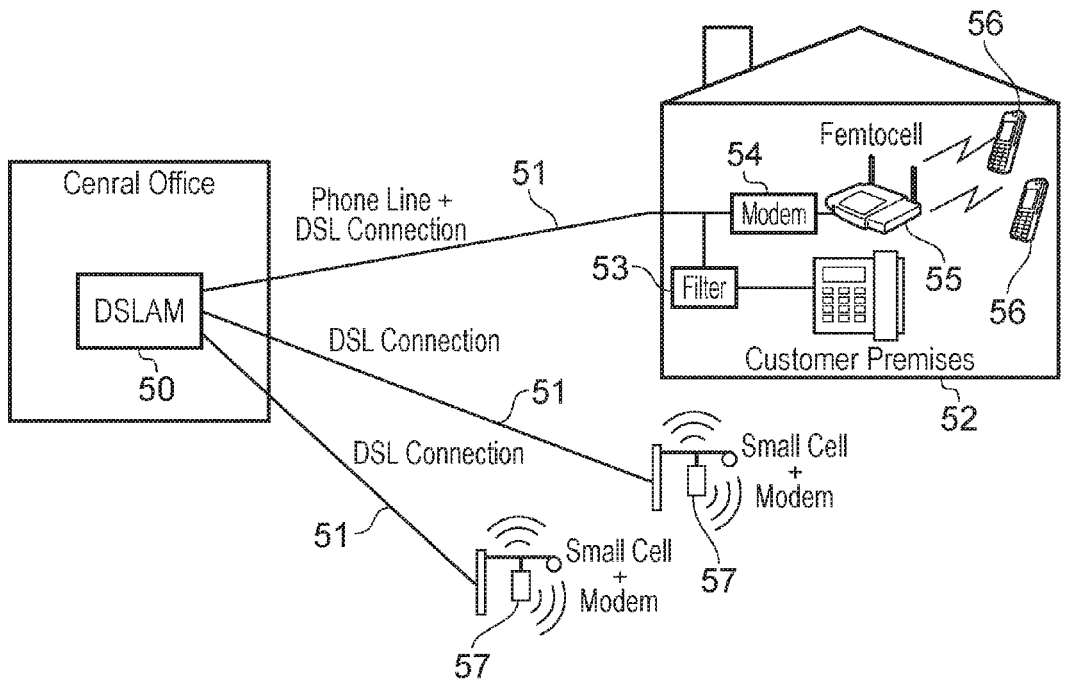
FIG. 6 shows a schematic arrangement of small cells connected to a central office over DSL connections.

An example ADSL scenario is shown schematically in FIG. 6. A DSL access multiplexer (DSLAM) 50 in an exchange or central office is connected by DSL connections 51 to a customer's house 52 where a filter 53 extracts the frequencies used for voice telephone calls, whilst a modem 54 connects to a femtocell router 55 when supports local mobile devices 56. Other DSL connections run to small cells 57 which also have a modem to support local mobile devices.

ADSL can generally only be distributed over short distances from the telephone exchange (the "last mile"), typically less than 4 km but has been known to exceed 8 km if the originally laid wire gauge allows for further distribution.

ADSL that operates with frequency-division duplex (FDD) uses two separate frequency bands with one band for the upstream transmission and the other for downstream transmission. The upstream band is used for communication from the end user to the telephone central office (exchange). The downstream band is used for communicating from the central office to the end user.

ADSL Annex A of ITU-T Rec. G.992.1 (ADSL over POTS), also known as G.DMT, uses the 26.075 kHz to 137.825 kHz band used for upstream communication and the 138 kHz to 1104 kHz band for downstream communication. G.DMT can deliver high-speed data communications at rates up to 8 Mbit/s downstream and 1.3 Mbit/s upstream. G.DMT uses discrete multitone (DMT) modulation, where each band is further divided into smaller frequency channels (also called bins) of 4.3125 kHz. The use of bins produces a transmission system known as coded orthogonal frequency-division multiplexing (COFDM). The ADSL signal is separated into 255 carriers (bins) centered on multiples of 4.3125 kHz. DMT has 224 downstream frequency bins and up to 31 upstream bins. From 2 up to 15 bits per symbol can be encoded on each bin on a good quality line. Bin N has center frequency of N×4.3125 kHz. The spectrum of each bin overlaps that of its neighbors—it is not confined to a 4.3125 kHz wide channel. However, the orthogonality of COFDM makes it possible to have overlapping bandwidth without interference.

Using DMT allows the communications equipment (user modem/router and exchange/DSLAM) to select only bins which are usable on the line thus effectively obtaining the best overall bit rate from the line at any given moment in time. With COFDM, a combined signal containing many frequencies (for each bin) is transmitted down the line. Fast Fourier Transform (and the inverse iFFT) is used to convert the signal on the line into the individual bins. A type of quadrature amplitude modulation (QAM) or phase-shift keying (PSK) is used to encode the bits within each bin. The quality of the line (which depends on the attenuation and signal-to-noise ratio (SNR)) at the frequency of the bin in question determines how many bits can be encoded within that bin. The number of bits encoded on each bin is between 2 and 15, depending on the attenuation and signal to noise ratio for that bin. SNR may differ for each bin and this plays an important factor for deciding how many bits can be encoded reliably on it.

During initial training to optimize transmission quality and speed, the ADSL modem tests each of the bins to determine the SNR at each bin's frequency. Distance from the telephone exchange, cable characteristics, interference from AM radio stations, and local interference and electrical noise at the modem's location can adversely affect the SNR at particular frequencies. Bins for frequencies exhibiting a reduced SNR will be used at a lower throughput rate or not at all; this reduces the maximum link capacity but allows the modem to maintain an adequate connection.

The DSL modem develops a plan on how to exploit each of the bins, sometimes termed "bits per bin" allocation. If the pattern of noise versus frequencies experienced in the bins changes, the DSL modem can alter the bits-per-bin allocations, in a process called "bitswap", where bins that have become more noisy are only required to carry fewer bits and other channels will be chosen to be given a higher burden. The data transfer capacity the DSL modem therefore reports is determined by the total of the bits-per-bin allocations of all the bins combined. Higher SNRs and more bins being in use gives a higher total link capacity, while lower SNRs or fewer bins being used gives a low link capacity. As line conditions change, bit swapping allows the modem to swap bits around different channels, without retraining, as each channel becomes more or less capable. If bit swapping is disabled then this does not happen and the modem needs to retrain in order to adapt to changing line conditions.

The total maximum capacity derived from summing the bits-per-bins is reported by DSL modems and is sometimes termed sync rate (also known as sync speed, downstream rate or DSL connection rate). However, the true maximum link capacity for user data transfer rate will be significantly lower because extra data are transmitted as protocol overhead, which could reduce the true maximum to around 84-87 percent. In addition, some ISPs will have traffic policies that limit maximum transfer rates further in the networks beyond the exchange, and traffic congestion on the Internet, heavy loading on servers and slowness or inefficiency in customers' computers may all contribute to reductions below the maximum attainable.

The choices the DSL modem makes can also be either conservative, where the modem chooses to allocate fewer bits per bin than it possibly could (a choice which makes for a slower connection), or less conservative in which more bits per bin are chosen in which case there is a greater risk case of error should future SNRs deteriorate to the point where the bits-per-bin allocations chosen are too high to cope with the greater noise present. This conservatism, involving a choice of using fewer bits per bin as a safeguard against future noise increases, is reported as the signal-to-noise ratio margin or SNR margin.

BT Wholesale's Dynamic Line Management (DLM)

The sync rate is the 'physical' speed of the connection between the modem and the local telephone exchange. It is determined by the characteristics of the line e.g., line length and quality. The sync rate is not fixed and can change each time the modem is rebooted or switch on. While it should remain stable for the majority of the time, small changes are normal for most users. One should only ever see significant changes in the event of a problem.

In BT broadband networks, the IP profile (also known as BRAS profile) is a speed limit applied by equipment in the telephone exchange the modem communicates with. The IP Profile is designed to stop users from sending more data down the phone line than it can physically handle. As such, it represents the maximum speed the user can achieve whilst also receiving a stable connection. The IP profile mechanism imposes an upper limit on the rate at which data destined for the user is transmitted. This rate restriction is imposed at the point where inbound data enters the BT Wholesale IP network from the Internet. The rate is chosen so that throughput can not exceed the throughput of the ADSL link. The IP Profile set by DLM may unfortunately be set to a figure that is somewhat below that which the DSL modem could support, which will limit the maximum inbound data delivery rate over the ADSL link to be below the maximum achievable rate.

The IP profile changes over time, and is derived from a consideration of the worst downstream sync rate used by the DSL modem during some recent period of time. If circumstances cause a drop in sync rate, the IP profile decreases immediately. If conditions later improve, the IP profile will only increase after a certain delay time. IP Profile values are chosen from a certain fixed list of rate values taken from a table and are determined by the downstream sync rate of the ADSL connection. Many sync rate values will correspond to the same IP Profile figure. It is often the case that a user's downstream sync rate, when overheads are accounted for, equates to a true maximum inbound throughput figure that falls between two permitted IP Profile levels and, in such a case, the lower level is used. As an example, if the downstream sync rate of a DSL modem is set to 1984 kbit/s, the associated IP Profile is 1500 kbit/s so the maximum permitted inbound data rate is 1500 kbit/s, but if the sync rate were to rise to 2016 kbit/s the IP Profile would be 1750 kbit/s.

Dynamic Line Management (DLM) is an automated system that BT uses to manage the performance of the broadband service. During the first ten days after the service has been provided, the line's performance is monitored and the lowest connection speed is noted. This figure is used from then on to define minimum service standards below which the service can be considered to have a fault. Both during this period and afterwards a system DLM constantly assesses the performance of the line in order to provide information to the end user's DSL modem to allow it to choose a suitable sync rate with which to connect to the DSLAM, balancing speed against the risk of errors due to changing noise conditions. DLM can make adjustments to the DSLAM output power, suggested target SNR margin and sync rate and can choose to apply a technique known as interleaving which aids error correction. Several factors dictate the sync rate, which limits the maximum attainable speed, such as the presence of noise within the frequency spectrum used by ADSL, but chiefly it is the distance from the Central Office (telephone exchange) which has the largest influence on the line's performance.

Handling Link Bandwidth Asymmetry with Rate Shaping (Throttling)

Further embodiments of the present invention provide an alternative approach to those described above based on the speed ratio, which use rate shapers to shape (throttle) the downstream and upstream rate of the PTP traffic to be equal but less than the maximum allowed upstream DSL link rate. Note that the PTP rate is always much smaller than the DSL link capacity available for user traffic. PTP messages can be sent up to a maximum rate of 256 packets per second. The rate shapers can be configured to shape PTP traffic at a constant bit rate in bits per second. Only PTP traffic at both ends of the link is rate shaped.

Figure 7:
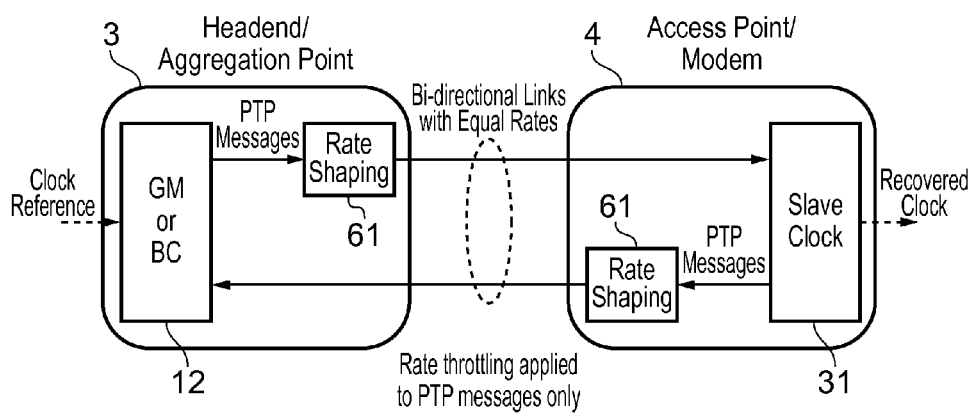
FIG. 7 shows, in schematic form, the use of rate shaping in a system according to an embodiment of the present invention.

FIG. 7 shows a system according to an embodiment of the present invention which uses rate shaping. Both the head-end/aggregation point 3 and the slave access point/modem 4 have rate shaping devices (limiters) 61 which control the rate of transfer of PTP traffic over the network 2. This results in PTP traffic over the network being symmetric in terms of transfer rates.

Simple Linear Approximation Technique for Offset and Skew Estimation

By using rate shaping to achieve the same bandwidth ($\xi=1$, meaning $S_{ds}=S_{us}$), then (7) becomes $$d = \frac{(T_{4,n} - T_{1,n}) + (1+\alpha)(T_{2,n} - T_{3,n}) - (p_{ds} + p_{us})}{2} \quad (43)$$

The transmission delays in both directions are equal given $S_{ds}=S_{us}$. If we define $d_{ds,total}=d+p_{ds}$ and $d_{us,total}=d+p_{us}$ to be the total delays for the downstream and upstream traffic, then the equation above simplifies to $$d_{ds,total}+d_{us,total}=(T_{4,n}-T_{1,n})+(1+\alpha)(T_{2,n}-T_{3,n}) \quad (44)$$

When the two total delays are equal, that is $d_{ds,total}=d_{us,total}=d_{path}$, then we have $$d_{path} = \frac{(T_{4,n} - T_{1,n}) + (1+\alpha)(T_{2,n} - T_{3,n})}{2}, \quad (45)$$

which is the classical equation for average delay computation when the delays in both directions are assumed to be equal. Given $d_{ds,total} = d + p_{ds}$, from (4) we can express the clock offset $\theta$ as $$\theta = T_{1,n} - (1+\alpha)T_{2,n} + d_{path} \quad (46)$$

Thus, by estimating the clock skew $\alpha$ from (17), then computing the average delay using (45), the clock offset $\theta$ can be computed using (46). The offset and skew can then be filtered using an EWMA filter before use in the estimation of the server time as given by (20).

Kalman Filter Based Technique for Offset and Skew Estimation

Similarly, by using rate shaping to achieve $\xi = 1$, the Kalman filter formulation can be revised to account for this condition. By setting $\xi = 1$ in (36) we get $$2(T_{1,n}T_{2,n} + p_{ds}) + (T_{4,n} - T_{1,n} + T_{2,n} - T_{3,n} - p_{ds} - p_{us}) = 2\theta_n - \alpha_n[(T_{2,n} - T_{3,n}) - 2T_{2,n}] + (\gamma_n - \epsilon_n) \quad (47)$$

which simplifies to $$(T_{1,n} - T_{2,n}) + (T_{4,n} - T_{3,n}) + (p_{ds} - p_{us}) = 2\theta_n + \alpha_n(T_{2,n} + T_{3,n}) + (\gamma_n - \epsilon_n), \quad (48)$$

where the various variables of the measurement equation are defined as follows
$y_n = (T_{1,n} - T_{2,n}) + (T_{4,n} - T_{3,n}) + (p_{ds} - p_{us})$ is a scalar,
$D_n = [2 \ (T_{2,n} + T_{3,n})]$ is a 1×2 matrix,
$X_n^T = [\theta_n \ \alpha_n]$ is a vector and
$v_n = (\gamma_n - \epsilon_n)$ is the measurement noise.

For the case where the downstream and upstream propagation delays are equal (i.e., $p_{ds} = p_{us}$), we get $$(T_{1,n} - T_{2,n}) + (T_{4,n} - T_{3,n}) = 2\theta_n + \alpha_n(T_{2,n} + T_{3,n}) + v_n \quad (49)$$

The equation (48) can be used if the delays $p_{ds}$ and $p_{us}$ are known. The factor $(p_{ds} - p_{us})$ constitutes a link asymmetry term in (48). The above equations ((48) or (49)) together with the process (or state) equations developed earlier can be used in the Kalman filter formulation when computing the clock offset $\theta_n$ and skew $\alpha_n$.

The systems and methods of the above embodiments may be implemented in a computer system (in particular in computer hardware or in computer software) in addition to the structural components and user interactions described.

The term "computer system" includes the hardware, software and data storage devices for embodying a system or carrying out a method according to the above described embodiments. For example, a computer system may comprise a central processing unit (CPU), input means, output means and data storage. Preferably the computer system has a monitor to provide a visual output display (for example in the design of the business process). The data storage may comprise RAM, disk drives or other computer readable media. The computer system may include a plurality of computing devices connected by a network and able to communicate with each other over that network.

The methods of the above embodiments may be provided as computer programs or as computer program products or computer readable media carrying a computer program which is arranged, when run on a computer, to perform the method(s) described above.

The term "computer readable media" includes, without limitation, any non-transitory medium or media which can be read and accessed directly by a computer or computer system. The media can include, but are not limited to, magnetic storage media such as floppy discs, hard disc storage media and magnetic tape; optical storage media such as optical discs or CD-ROMs; electrical storage media such as memory, including RAM, ROM and flash memory; and hybrids and combinations of the above such as magnetic/optical storage media.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

In particular, although the methods of the above embodiments have been described as being implemented on the systems of the embodiments described, the methods and systems of the present invention need not be implemented in conjunction with each other, but can be implemented on alternative systems or using alternative methods respectively.

REFERENCES

[1]. *ITU-T Recommendation G.8271/Y.1366*, Time and Phase Synchronization Aspects of Packet Networks, February 2012.

[2]. R. E. Kalman, "A New Approach to Linear Filtering and Prediction Problems," *Transaction of the ASME—Journal of Basic Engineering*, March 1960, pp. 35-45.

[3]. C. D. Pack and B. A. Whitaker, "Kalman Filter Models for Network Forecasting," *The Bell System Technical Journal*, Vol. 61, No. 1, January 1982, pp. 1-14.

All references referred to above are hereby incorporated by reference.

The invention claimed is:

1. A method of synchronising a slave clock in a slave device with a master clock in a master device, the master and slave device being connected by a network having asymmetric transmission rates, the method including the steps of:

exchanging timing messages between the master device and the slave device over said network and recording timestamps which are the times of sending and receiving said messages;

calculating or estimating a ratio of the transmission rate of data from the master to the slave to the transmission rate of data from the slave to the master;

calculating a skew and offset of the slave clock compared to the master clock, wherein calculating the offset includes using said timestamps and said ratio of the transmission rates; and synchronizing said slave clock using said calculated offset and skew;

wherein the step of calculating the skew and offset uses an exponentially weighted moving average filter applied to said timestamps and said transmission rates;

wherein the step of calculating the skew and offset calculates the skew $\alpha$ as the average of the skew $\alpha_1$ calculated in the forward direction from master to slave and the skew $\alpha_2$ calculated in the reverse direction from the slave to the master:

$$\alpha_1 = \frac{(T_{1,n} - T_{1,n-1})}{(T_{2,n} - T_{2,n-1})} - 1 \ \& \ \alpha_2 = \frac{(T_{4,n} - T_{4,n-1})}{(T_{3,n} - T_{3,n-1})} - 1,$$

wherein
$T_{1,n}$ is the time of departure of the nth Sync message as measured by the master clock;
$T_{2,n}$ is the time of receipt as recorded by the slave clock on receipt of the nth Sync message;
$T_{3,n}$ is the time of transmission of the nth Delay_Req message as recorded by the slave clock;
$T_{4,n}$ is the time of receipt of the nth Delay_Req message as recorded by the master clock,
and calculates the offset θ as $\theta = T_{1,n} - (1+\alpha)T_{2,n} + d + p_{ds}$, wherein
ξ is the ratio of the transmission rate from master to slave to the transmission rate from slave to master,
$p_{ds}$ is the fixed physical link (or propagation) delay of the network between the master and the slave device; and $$d = \frac{(T_{4,n} - T_{1,n}) + (1+\alpha)(T_{2,n} - T_{3,n}) - (p_{ds} + p_{us})}{(1+\xi)},$$

wherein:
$p_{us}$ is the fixed physical link delay of the network between the slave and the master device,
and updates the offset and skew according to the update equations:
$\alpha_n = \mu\alpha_n + (1-\mu)\alpha_{n-1}, 0 < \mu < 1$ and
$\theta_n = \mu\theta_n + (1-\mu)\theta_{n-1}, 0 < \mu < 1$.

2. A method of synchronising a slave clock in a slave device with a master clock in a master device, the master and slave device being connected by a network having asymmetric transmission rates, the method including the steps of:
exchanging timing messages between the master device and the slave device over said network and recording timestamps which are the times of sending and receiving said messages;
calculating or estimating a ratio of the transmission rate of data from the master to the slave to the transmission rate of data from the slave to the master;
calculating a skew and offset of the slave clock compared to the master clock, wherein calculating the offset includes using said timestamps and said ratio of the transmission rates; and
synchronizing said slave clock using said calculated offset and skew; and
wherein the step of calculating the skew and offset uses a Kalman filter; and
wherein, to determine the skew $\alpha_n$ and the offset $\theta_n$ at time n, the Kalman filter is applied to:
the state equation $$X_n = \begin{bmatrix} \theta_n \\ \alpha_n \end{bmatrix} = \begin{bmatrix} 1 & (T_{1,n} - T_{1,n-1}) \\ 0 & 1 \end{bmatrix} \begin{bmatrix} \theta_{n-1} \\ \alpha_{n-1} \end{bmatrix} + \begin{bmatrix} w_{\theta,n} \\ w_{\alpha,n} \end{bmatrix}$$

and
to the measurement equation $y_n = D_n X_n + v_n$ wherein:
$y_n = (1+\xi)(T_{1,n} - T_{2,n} + p_{ds}) + (T_{4,n} - T_{1,n} + T_{2,n} - T_{3,n} - p_{ds} - p_{us})$ is a scalar, $D_n = [(1+\xi) - [(T_{2,n} - T_{3,n}) - (1+\xi)T_{2,n}]]$ is a 1×2 matrix, $X_n^T = [\theta_n \alpha_n]$ is a vector and $v_n = (\gamma_n - \xi\epsilon_n)$ is the measurement noise, and wherein:

$T_{1,n}$ is the time of departure of the nth Sync message as measured by the master clock;
$T_{2,n}$ is the time of receipt as recorded by the slave clock on receipt of the nth Sync message;
$T_{3,n}$ is the time of transmission of the nth Delay_Req message as recorded by the slave clock;
$T_{4,n}$ is the time of receipt of the nth Delay_Req message as recorded by the master clock;
ξ is the ratio of the transmission rate from master to slave to the transmission rate from slave to master,
$p_{ds}$ is the fixed physical link (or propagation) delay of the network between the master and the slave device;
ε is the stochastic delay in the transmission of messages between the master and the slave device;
$p_{us}$ is the fixed physical link delay of the network between the slave and the master device; and
γ is the stochastic delay in the transmission of messages between the slave and the master device.

3. A slave device connected to a master device having a master clock by a network having asymmetric transmission rates, the slave device having a slave clock and a processor, the slave device being arranged to:
exchange timing messages with the master device over said network and record timestamps which are the times of sending and receiving said messages according to the respective clocks; and
calculate or estimate a ratio of the transmission rate of data from the master to the slave to the transmission rate of data from the slave to the master, wherein:
the processor is arranged to:
calculate a skew and offset of the slave clock compared to the master clock, wherein calculating the offset includes using said timestamps and said ratio of the transmission rates; and
synchronize said slave clock using said calculated offset and skew; and
wherein the processor calculates the skew and offset using an exponentially weighted moving average filter applied to said timestamps and said transmission rates by calculating the skew α as the average of the skew $\alpha_1$ calculated in the forward direction from master to slave and the skew $\alpha_2$ calculated in the reverse direction from the slave to the master:

$$\alpha_1 = \frac{(T_{1,n} - T_{1,n-1})}{(T_{2,n} - T_{2,n-1})} - 1 \ \& \ \alpha_2 = \frac{(T_{4,n} - T_{4,n-1})}{(T_{3,n} - T_{3,n-1})} - 1,$$

wherein
$T_{1,n}$ is the time of departure of the nth Sync message as measured by the master clock;
$T_{2,n}$ is the time of receipt as recorded by the slave clock on receipt of the nth Sync message;
$T_{3,n}$ is the time of transmission of the nth Delay_Req message as recorded by the slave clock;
$T_{4,n}$ is the time of receipt of the nth Delay_Req message as recorded by the master clock, and calculating the offset θ as $\theta = T_{1,n} - (1+\alpha)T_{2,n} + d + p_{ds}$, wherein:
ξ is the ratio of the transmission rate from master to slave to the transmission rate from slave to master, $p_{ds}$ is the fixed physical link (or propagation) delay of the network between the master and the slave device; and $$d = \frac{(T_{4,n} - T_{1,n}) + (1 + \alpha)(T_{2,n} - T_{3,n}) - (p_{ds} + p_{us})}{(1 + \xi)},$$

wherein:
$p_{us}$ is the fixed physical link delay of the network between the slave and the master device,
and updates the offset and skew according to the update equations:

$\hat{\alpha}_n = \mu\alpha_n + (1-\mu)\hat{\alpha}_{n-1}$, $0 < \mu < 1$ and $\hat{\theta}_n = \mu\theta_n + (1-\mu)\hat{\theta}_{n-1}$, $0 < \mu < 1$.

4. A slave device connected to a master device having a master clock by a network having asymmetric transmission rates, the slave device having a slave clock and a processor, the slave device being arranged to:
exchange timing messages with the master device over said network and record timestamps which are the times of sending and receiving said messages according to the respective clocks; and
calculate or estimate a ratio of the transmission rate of data from the master to the slave to the transmission rate of data from the slave to the master, wherein:
the processor is arranged to:
calculate a skew and offset of the slave clock compared to the master clock, wherein calculating the offset includes using said timestamps and said ratio of the transmission rates; and
synchronize said slave clock using said calculated offset and skew; and
wherein the processor calculates the skew and offset using a Kalman filter to determine the skew $\alpha_n$ and the offset $\theta_n$ at time n, the Kalman filter being applied to:
the state equation $$X_n = \begin{bmatrix} \theta_n \\ \alpha_n \end{bmatrix} = \begin{bmatrix} 1 & (T_{1,n} - T_{1,n-1}) \\ 0 & 1 \end{bmatrix} \begin{bmatrix} \theta_{n-1} \\ \alpha_{n-1} \end{bmatrix} + \begin{bmatrix} w_{\theta,n} \\ w_{\alpha,n} \end{bmatrix}$$

and
to the measurement equation $y_n = D_n X_n + v_n$
wherein:

$y_n = (1+\xi)(T_{1,n} - T_{2,n} + p_{ds}) + (T_{4,n} - T_{1,n} + T_{2,n} - T_{3,n} - p_{ds} - p_{us})$ is a scalar, $D_n = [(1+\xi) - [(T_{2,n} - T_{3,n}) - (1+\xi)T_{2,n}]]$ is a 1×2 matrix, $X_n^T = [\theta_n \alpha_n]$ is a vector and $v_n = (\gamma_n - \xi\epsilon_n)$ is the measurement noise, and wherein:

$T_{1,n}$ is the time of departure of the nth Sync message as measured by the master clock;
$T_{2,n}$ is the time of receipt as recorded by the local clock on receipt of the nth Sync message;
$T_{3,n}$ is the time of transmission of the nth Delay_Req message as recorded by the slave clock;
$T_{4,n}$ is the time of receipt of the nth Delay_Req message as recorded by the master clock;
$\xi$ is the ratio of the transmission rate from master to slave to the transmission rate from slave to master,
$p_{ds}$ is the fixed physical link (or propagation) delay of the network between the master and the slave device;
$\epsilon$ is the stochastic delay in the transmission of messages between the master and the slave device;
$p_{us}$ is the fixed physical link delay of the network between the slave and the master device; and
$\gamma$ is the stochastic delay in the transmission of messages between the slave and the master device.

5. A system including:
a master device having a master clock;
a slave device having a slave clock and a processor; and
a network connecting said master device and said slave device and having asymmetric transmission rates, wherein
the slave device is arranged to:
exchange timing messages with the master device over said network and record timestamps which are the times of sending and receiving said messages according to the respective clocks; and
calculate or estimate a ratio of the transmission rate of data from the master to the slave to the transmission rate of data from the slave to the master, and further wherein:
the processor is arranged to:
calculate a skew and offset of the slave clock compared to the master clock, wherein calculating the offset includes using said timestamps and said ratio of the transmission rates; and
synchronize said slave clock using said calculated offset and skew; and
wherein the processor calculates the skew and offset using an exponentially weighted moving average filter applied to said timestamps and said transmission rates by calculating the skew $\alpha$ as the average of the skew $\alpha_1$ calculated in the forward direction from master to slave and the skew $\alpha_2$ calculated in the reverse direction from the slave to the master:

$$\alpha_1 = \frac{(T_{1,n} - T_{1,n-1})}{(T_{2,n} - T_{2,n-1})} - 1 \ \& \ \alpha_2 = \frac{(T_{4,n} - T_{4,n-1})}{(T_{3,n} - T_{3,n-1})} - 1,$$

wherein
$T_{1,n}$ is the time of departure of the nth Sync message as measured by the master clock;
$T_{2,n}$ is the time of receipt as recorded by the local clock on receipt of the nth Sync message;
$T_{3,n}$ is the time of transmission of the nth Delay_Req message as recorded by the slave clock;
$T_{4,n}$ is the time of receipt of the nth Delay_Req message as recorded by the master clock, and calculating the offset $\theta$ as $\theta = T_{1,n} - (1+\alpha)T_{2,n} + d + p_{ds}$, wherein:
$\xi$ is the ratio of the transmission rate from master to slave to the transmission rate from slave to master,
$p_{ds}$ is the fixed physical link (or propagation) delay of the network between the master and the slave device; and $$d = \frac{(T_{4,n} - T_{1,n}) + (1 + \alpha)(T_{2,n} - T_{3,n}) - (p_{ds} + p_{us})}{(1 + \xi)},$$

wherein:
$p_{us}$ is the fixed physical link delay of the network between the slave and the master device, and updates the offset and skew according to the update equations:

$$\hat{\alpha}_n = \mu\alpha_n + (1-\mu)\hat{\alpha}_{n-1}, \ 0<\mu<1 \text{ and}$$

$$\hat{\theta}_n = \mu\theta_n + (1-\mu)\hat{\theta}_{n-1}, \ 0<\mu<1.$$

6. A system including:
a master device having a master clock;
a slave device having a slave clock and a processor; and
a network connecting said master device and said slave device and having asymmetric transmission rates, wherein
the slave device is arranged to:
    exchange timing messages with the master device over said network and record timestamps which are the times of sending and receiving said messages according to the respective clocks; and
    calculate or estimate a ratio of the transmission rate of data from the master to the slave to the transmission rate of data from the slave to the master, and further wherein:
the processor is arranged to:
    calculate a skew and offset of the slave clock compared to the master clock, wherein calculating the offset includes using said timestamps and said ratio of the transmission rates; and
synchronize said slave clock using said calculated offset and skew; and
wherein the processor calculates the skew and offset using a Kalman filter to determine the skew $\alpha_n$ and the offset $\theta_n$ at time n, the Kalman filter being applied to:
the state equation $$X_n = \begin{bmatrix} \theta_n \\ \alpha_n \end{bmatrix} = \begin{bmatrix} 1 & (T_{1,n} - T_{1,n-1}) \\ 0 & 1 \end{bmatrix} \begin{bmatrix} \theta_{n-1} \\ \alpha_{n-1} \end{bmatrix} + \begin{bmatrix} w_{\theta,n} \\ w_{\alpha,n} \end{bmatrix}$$

and
to the measurement equation $y_n = D_n X_n + v_n$
wherein:

$y_n = (1+\xi)(T_{1,n} - T_{2,n} + p_{ds}) + (T_{4,n} - T_{1,n} + T_{2,n} - T_{3,n} - p_{ds} - p_{us})$ is a scalar, $D_n = [(1+\xi) - [(T_{2,n} - T_{3,n}) - (1+\xi)T_{2,n}]]$ is a 1×2 matrix, $X_n^T = [\theta_n \alpha_n]$ is a vector and $v_n = (\gamma_n - \xi\epsilon_n)$ is the measurement noise, and wherein:

$T_{1,n}$ is the time of departure of the nth Sync message as measured by the master clock;
$T_{2,n}$ is the time of receipt as recorded by the slave clock on receipt of the nth Sync message;
$T_{3,n}$ is the time of transmission of the nth Delay_Req message as recorded by the slave clock;
$T_{4,n}$ is the time of receipt of the nth Delay_Req message as recorded by the master clock;
$\xi$ is the ratio of the transmission rate from master to slave to the transmission rate from slave to master;
$p_{ds}$ is the fixed physical link (or propagation) delay of the network between the master and the slave device;
$\xi$ is the stochastic delay in the transmission of messages between the master and the slave device;
$p_{ds}$ is the fixed physical link delay of the network between the slave and the master device; and
$\gamma$ is the stochastic delay in the transmission of messages between the slave and the master device.

7. A method of synchronising a slave clock in a slave device with a master clock in a master device, the master and slave device being connected by a network having asymmetric transmission rates, the method including the steps of:
    determining the maximum communication rate over said network between the slave and the master;
    setting a communication rate for transmitting timestamps in both directions between the master and the slave at a rate which is less than said maximum communication rate;
    exchanging timing messages between the master device and the slave device over said network at said set communications rate and recording timestamps which are the times of sending and receiving said messages;
    calculating a skew and offset of the slave clock compared to the master clock using said timestamps; and
    synchronizing said slave clock using said calculated offset and skew; and
wherein the step of calculating the skew and offset uses an exponentially weighted moving average filter applied to said timestamps and said transmission rates; and
wherein the step of calculating the skew and offset calculates the skew $\alpha$ as the average of the skew $\alpha_1$ calculated in the forward direction from master to slave and the skew $\alpha_2$ calculated in the reverse direction from the slave to the master:

$$\alpha_1 = \frac{(T_{1,n} - T_{1,n-1})}{(T_{2,n} - T_{2,n-1})} - 1 \ \& \ \alpha_2 = \frac{(T_{4,n} - T_{4,n-1})}{(T_{3,n} - T_{3,n-1})} - 1,$$

wherein
$T_{1,n}$ is the time of departure of the nth Sync message as measured by the master clock;
$T_{2,n}$ is the time of receipt as recorded by the slave clock on receipt of the nth Sync message;
$T_{3,n}$ is the time of transmission of the nth Delay_Req message as recorded by the slave clock;
$T_{4,n}$ is the time of receipt of the nth Delay_Req message as recorded by the master clock,
and calculates the offset $\theta$ as $\theta = T_{1,n} - (1+\alpha)T_{2,n} + d + p_{ds}$, wherein:
$p_{ds}$ is the fixed physical link (or propagation) delay of the network between the master and the slave device; and $$d = \frac{(T_{4,n} - T_{1,n}) + (1+\alpha)(T_{2,n} - T_{3,n}) - (p_{ds} + p_{us})}{(1+\xi)},$$

wherein:
$p_{us}$ is the fixed physical link delay of the network between the slave and the master device,
and updates the offset and skew according to the update equations:

$$\hat{\alpha}_n = \mu\alpha_n + (1-\mu)\hat{\alpha}_{n-1}, \ 0<\mu<1 \text{ and}$$

$$\hat{\theta}_n = \mu\theta_n + (1-\mu)\hat{\theta}_{n-1}, \ 0<\mu<1.$$

8. The method according to claim 7 wherein only the rate of data transfer of the timing messages is restricted and other data is transferred at normal, unrestricted rates.

9. A method of synchronising a slave clock in a slave device with a master clock in a master device, the master and slave device being connected by a network having asymmetric transmission rates, the method including the steps of:

determining the maximum communication rate over said network between the slave and the master;
setting a communication rate for transmitting timestamps in both directions between the master and the slave at a rate which is less than said maximum communication rate;
exchanging timing messages between the master device and the slave device over said network at said set communication rate and recording timestamps which are the times of sending and receiving said messages;
calculating a skew and offset of the slave clock compared to the master clock using said timestamps; and
synchronizing said slave clock using said calculated offset and skew; and
wherein the step of calculating the skew and offset uses a Kalman filter; and
wherein, to determine the skew $\alpha_n$ and the offset $\theta_n$ at time n, the Kalman filter is applied to:
the state equation $$X_n = \begin{bmatrix} \theta_n \\ \alpha_n \end{bmatrix} = \begin{bmatrix} 1 & (T_{1,n} - T_{1,n-1}) \\ 0 & 1 \end{bmatrix} \begin{bmatrix} \theta_{n-1} \\ \alpha_{n-1} \end{bmatrix} + \begin{bmatrix} w_{\theta,n} \\ w_{\alpha,n} \end{bmatrix}$$

and
to the measurement equation $y_n = D_n X_n + v_n$
wherein:

$y_n = (T_{1,n} - T_{2,n}) + (T_{4,n} - T_{3,n}) + (p_{ds} - p_{us})$ is a scalar, $D_n = [2(T_{2,n} + T_{3,n})]$ is a 1×2 matrix, $X_n^T = [\theta_n \alpha_n]$ is a vector and $v_n = (\gamma_n - \epsilon_n)$ is the measurement noise, and wherein:

$T_{1,n}$ is the time of departure of the nth Sync message as measured by the master clock;
$T_{2,n}$ is the time of receipt as recorded by the slave clock on receipt of the nth Sync message;
$T_{3,n}$ is the time of transmission of the nth Delay_Req message as recorded by the slave clock;
$T_{4,n}$ is the time of receipt of the nth Delay_Req message as recorded by the master clock;
$p_{ds}$ is the fixed physical link (or propagation) delay of the network between the master and the slave device;
$\epsilon$ is the stochastic delay in the transmission of messages between the master and the slave device;
$p_{us}$ is the fixed physical link delay of the network between the slave and the master device;
$\gamma$ is the stochastic delay in the transmission of messages between the slave and the master device.

10. A system including:
a master device having a master clock and a first rate controller;
a slave device having a slave clock, a processor and a second rate controller; and
a network connecting said master device and said slave device and having asymmetric transmission rates, wherein
the system is arranged to:
estimate or determine the maximum communication rate over said network between the slave and the master; and
setting a timing message exchange rate which is a rate which is less than said maximum communication rate;
the master and slave devices are arranged to:
exchange timing messages between the master device and the slave device over said network at said set exchange rate and recording timestamps which are the times of sending and receiving said messages, wherein the first and second rate controller restrict the rate of data transfer of said timing messages to said tinting message exchange rate; and
the processor is arranged to:
calculate the skew and offset of the slave clock compared to the master clock in said timestamps; and
synchronize said slave clock using said calculated offset and skew; and
wherein the processor calculates the skew and offset using an exponentially weighted moving average filter applied to said timestamps and said transmission rates by calculating the skew $\alpha$ as the average of the skew $\alpha_1$ calculated in the forward direction from master to slave and the skew $\alpha_2$ calculated in the reverse direction from the slave to the master:

$$\alpha_1 = \frac{(T_{1,n} - T_{1,n-1})}{(T_{2,n} - T_{2,n-1})} - 1 \ \& \ \alpha_2 = \frac{(T_{4,n} - T_{4,n-1})}{(T_{3,n} - T_{3,n-1})} - 1,$$

wherein
$T_{1,n}$ is the time of departure of the nth Sync message as measured by the master clock;
$T_{2,n}$ is the time of receipt as recorded by the slave clock on receipt of the nth Sync message;
$T_{3,n}$ is the time of transmission of the nth Delay_Req message as recorded by the slave clock;
$T_{4,n}$ is the time of receipt of the nth Delay_Req message as recorded by the master clock,
and calculates the offset $\theta$ as $\theta = T_{1,n} - (1+\alpha)T_{2,n} + d + p_{ds}$, wherein:
$p_{ds}$ is the fixed physical link (or propagation) delay of the network between the master and the slave device; and $$d = \frac{(T_{4,n} - T_{1,n}) + (1+\alpha)(T_{2,n} - T_{3,n}) - (p_{ds} + p_{us})}{(1+\xi)},$$

wherein
$p_{us}$ is the fixed physical link delay of the network between the slave and the master device,
and updates the offset and skew according to the update equations:
$\hat{\alpha}_n = \mu \alpha_n + (1-\mu)\hat{\alpha}_{n-1}$, $0 < \mu < 1$ and $\hat{\theta}_n = \mu \theta_n + (1-\mu)\hat{\theta}_{n-1}$, $0 < \mu < 1$.

11. A system including:
a master device having a master clock and a first rate controller;
a slave device having a slave clock, a processor and a second rate controller; and
a network connecting said master device and said slave device and having asymmetric transmission rates, wherein
the system is arranged to:
estimate or determine the maximum communication rate over said network between the slave and the master; and
setting a timing message exchange rate which is a rate which is less than said maximum communication rate;

the master and slave devices are arranged to:
exchange timing messages between the master device and the slave device over said network at said set exchange rate and recording timestamps which are the times of sending and receiving said messages, wherein the first and second rate controller restrict the rate of data transfer of said timing messages to said timing message exchange rate; and the processor is arranged to:
calculate the skew and offset of the slave clock compared to the master clock using said timestamps; and
synchronize said slave clock using said calculated offset and skew; and wherein the processor calculates the skew and offset using a Kalman filter to determine the skew $\alpha_n$ and the offset $\theta_n$ at time n, the Kalman filter being applied to:
the state equation $$X_n = \begin{bmatrix} \theta_n \\ \alpha_n \end{bmatrix} = \begin{bmatrix} 1 & (T_{1,n} - T_{1,n-1}) \\ 0 & 1 \end{bmatrix} \begin{bmatrix} \theta_{n-1} \\ \alpha_{n-1} \end{bmatrix} + \begin{bmatrix} w_{\theta,n} \\ w_{\alpha,n} \end{bmatrix}$$

and
to the measurement equation $y_n = D_n X_n + v_n$ wherein:

$y_n = (T_{1,n} - T_{2,n}) + (T_{4,n} - T_{3,n}) + (p_{ds} - p_{us})$ is a scalar, $D_n = [2(T_{2,n} + T_{3,n})]$ is a 1×2 matrix, $X_n^T = [\theta_n \alpha_n]$ is a vector and $v_n = (\gamma_n - \epsilon_n)$ is the measurement noise, and wherein:

$T_{1,n}$ is the time of departure of the nth Sync message as measured by the master clock;

$T_{2,n}$ is the time of receipt as recorded by the slave clock on receipt of the nth Sync message;

$T_{3,n}$ is the time of transmission of the nth Delay_Req message as recorded by the slave clock;

$T_{4,n}$ is the time of receipt of the nth Delay_Req message as recorded by the master clock;

$p_{ds}$ is the fixed physical link (or propagation) delay of the network between the master and the slave device;

$\epsilon$ is the stochastic delay in the transmission of messages between the master and the slave device;

$p_{us}$ is the fixed physical link delay of the network between the slave and the master device;

$\gamma$ is the stochastic delay in the transmission of messages between the slave and the master device.

* * * * *